(12) United States Patent
Tang et al.

(10) Patent No.: US 8,346,735 B1
(45) Date of Patent: Jan. 1, 2013

(54) CONTROLLING MULTI-STEP STORAGE MANAGEMENT OPERATIONS

(75) Inventors: Xuan Tang, Hopkinton, MA (US); Russell R. Laporte, Webster, MA (US); Gregory W. Lazar, Upton, MA (US); Sriram Krishnan, Shrewsbury, MA (US); Ying Xie, Northborough, MA (US)

(73) Assignee: EMC Corporation, Hopkinton, MA (US)

(*) Notice: Subject to any disclaimer, the term of this patent is extended or adjusted under 35 U.S.C. 154(b) by 445 days.

(21) Appl. No.: 12/241,417

(22) Filed: Sep. 30, 2008

(51) Int. Cl.
*G06F 17/00* (2006.01)
(52) U.S. Cl. .................................................. 707/675
(58) Field of Classification Search .................. None
See application file for complete search history.

(56) References Cited

U.S. PATENT DOCUMENTS

| | | | |
|---|---|---|---|
| 5,619,704 A * | 4/1997 | Yagi et al. ...................... | 710/262 |
| 2003/0037177 A1* | 2/2003 | Sutton et al. ................... | 709/316 |
| 2004/0158549 A1* | 8/2004 | Matena et al. .................... | 707/1 |
| 2004/0243699 A1* | 12/2004 | Koclanes et al. ............. | 709/224 |
| 2005/0132052 A1* | 6/2005 | Uttamchandani et al. ..... | 709/226 |
| 2005/0138174 A1* | 6/2005 | Groves et al. ................. | 709/226 |
| 2005/0192979 A1* | 9/2005 | Keller et al. ................. | 707/100 |
| 2010/0011037 A1* | 1/2010 | Kazar ........................... | 707/205 |

* cited by examiner

*Primary Examiner* — Yuk Ting Choi
(74) *Attorney, Agent, or Firm* — Krishnendu Gupta; Jason A. Reyes; Deepika Bhayana

(57) ABSTRACT

A method is used in controlling multi-step storage management operations. From a specification of a desired configuration of a data storage system, a description of a multi-step transaction for producing the desired configuration is derived. The description includes directions for reacting to results of an intermediate step within the multi-step transaction. Management operations are invoked based on the description.

19 Claims, 18 Drawing Sheets

Storage Allocation Wizard

Storage Pool

A Storage Pool is needed to group physical disks together that will be used for the Thin LUNs.

Please select an existing Storage Pool to place your Thin LUNs or create a new one.

○ Create New Storage Pool
● Select from Existing Storage Pools

| Name | ID | RAID Type | Drive | Avail. Capacity | Avail. Reserved | Properties |
|---|---|---|---|---|---|---|
| Storage Pool 1 | 1 | RAID6 | FC | 500 GB | 300 GB | Thin Pool Prop |
| Exchange Pool | 2 | RAID6 | FC | 500 GB | 50 GB | Thin Pool Prop |
| Testing Pool | 3 | RAID5 | FC | 500 GB | 200 MB | Thin Pool Prop |

[< Back] [Next >] [Finish] [Cancel]

FIG. 9

Storage Allocation Wizard

Create New Storage Pool

A new Storage Pool containing physical disks will be created using the parameters entered below.
Click here for more information on how the Storage Pool will be created.

Storage Pool Name: Thin Pool 1
Storage Pool Description: This Storage Pool is to be used to create Thin LUNs for the Finance department
RAID Type: RAID5 (recommended) ▽

Total Available Physical Capacity: 5TB
Capacity: 50 ▽  ○ GB  ○ TB  ◉ % of Available Space ☐ Show Storage Pool creation details when 'Next' is clicked < Back    Next >    Finish    Cancel

FIG. 10

ToDo LIST HEADER

- OPERATION STATE
- OPERATION TIME STAMP
- TARGET OBJECT ID
- OPERATION ERROR STATE

ToDo ACTION LIST

ACTION 1

ACTION 2

ACTION 3

FIG. 13

CONTROLLING MULTI-STEP STORAGE MANAGEMENT OPERATIONS

BACKGROUND

1. Technical Field

This application generally relates to controlling multi-step storage management operations.

2. Description of Related Art

Computer systems may include different resources used by one or more host processors. Resources and host processors in a computer system may be interconnected by one or more communication connections. These resources may include, for example, data storage devices such as those included in the data storage systems manufactured by EMC Corporation. These data storage systems may be coupled to one or more servers or host processors and provide storage services to each host processor. Multiple data storage systems from one or more different vendors may be connected and may provide common data storage for one or more host processors in a computer system.

A host processor may perform a variety of data processing tasks and operations using the data storage system. For example, a host processor may perform basic system I/O operations in connection with data requests, such as data read and write operations.

Host processor systems may store and retrieve data using a storage device containing a plurality of host interface units, disk drives, and disk interface units. The host systems access the storage device through a plurality of channels provided therewith. Host systems provide data and access control information through the channels to the storage device and the storage device provides data to the host systems also through the channels. The host systems do not address the disk drives of the storage device directly, but rather, access what appears to the host systems as a plurality of logical disk units. The logical disk units may or may not correspond to the actual disk drives. Allowing multiple host systems to access the single storage device unit allows the host systems to share data in the device. In order to facilitate sharing of the data on the device, additional software on the data storage systems may also be used.

RAID (Redundant Array of independent or Inexpensive Disks) parity schemes may be utilized to provide error detection during the transfer and retrieval of data across a storage system (also known as storage arrays or arrays).

In the industry there have become defined several levels of RAID systems. The first level, RAID-0, combines two or more drives to create a larger virtual disk. In a dual drive RAID-0 system one disk contains the low numbered sectors or blocks and the other disk contains the high numbered sectors or blocks, forming one complete storage space. RAID-0 systems generally interleave the sectors of the virtual disk across the component drives, thereby improving the bandwidth of the combined virtual disk. Interleaving the data in that fashion is referred to as striping. RAID-0 systems provide no redundancy of data, so if a drive fails or data becomes corrupted, no recovery is possible short of backups made prior to the failure.

RAID-1 systems include one or more disks that provide redundancy of the virtual disk. One disk is required to contain the data of the virtual disk, as if it were the only disk of the array. One or more additional disks contain the same data as the first disk, providing a "mirror" of the data of the virtual disk. A RAID-1 system will contain at least two disks, the virtual disk being the size of the smallest of the component disks. A disadvantage of RAID-1 systems is that a write operation must be performed for each mirror disk, reducing the bandwidth of the overall array. In a dual drive RAID-1 system, the first disk and the second disk contain the same sectors or blocks, each disk holding exactly the same data.

RAID-2 systems provide for error correction through hamming codes. The component drives each contain a particular bit of a word, or an error correction bit of that word. RAID-2 systems automatically and transparently detect and correct single-bit defects, or single drive failures, while the array is running. Although RAID-2 systems improve the reliability of the array over other RAID types, they are less popular than some other systems due to the expense of the additional drives, and redundant onboard hardware error correction.

RAID-4 systems are similar to RAID-0 systems, in that data is striped over multiple drives. For example, the storage spaces of two disks are added together in interleaved fashion, while a third disk contains the parity of the first two disks. RAID-4 systems are unique in that they include an additional disk containing parity. For each byte of data at the same position on the striped drives, parity is computed over the bytes of all the drives and stored to the parity disk. The XOR operation is used to compute parity, providing a fast and symmetric operation that can regenerate the data of a single drive, given that the data of the remaining drives remains intact. RAID-3 systems are essentially RAID-4 systems with the data striped at byte boundaries, and for that reason RAID-3 systems are generally slower than RAID-4 systems in most applications. RAID-4 and RAID-3 systems therefore are useful to provide virtual disks with redundancy, and additionally to provide large virtual drives, both with only one additional disk drive for the parity information. They have the disadvantage that the data throughput is limited by the throughput of the drive containing the parity information, which must be accessed for every read and write operation to the array.

RAID-5 systems are similar to RAID-4 systems, with the difference that the parity information is striped over all the disks with the data. For example, first, second, and third disks may each contain data and parity in interleaved fashion. Distributing the parity data generally increases the throughput of the array as compared to a RAID-4 system. RAID-5 systems may continue to operate though one of the disks has failed. RAID-6 systems are like RAID-5 systems, except that dual parity is kept to provide for normal operation if up to the failure of two drives.

Combinations of RAID systems are also possible. For example, a four disk RAID 1+0 system provides a concatenated file system that is also redundant. The first and second disks are mirrored, as are the third and fourth disks. The combination of the mirrored sets forms a storage space that is twice the size of one individual drive, assuming that all four are of equal size. Many other combinations of RAID systems are possible.

In at least some cases, when a logical volume is configured so that its data is written across multiple disk drives in the striping technique, the logical volume is operating in RAID-0 mode. Alternatively, if the logical volume's parity information is stored on one disk drive and its data is striped across multiple other disk drives, the logical volume is operating in RAID-3 mode. If both data and parity information are striped across multiple disk drives, the logical volume is operating in RAID-5 mode.

In a common implementation, a Storage Area Network (SAN) is used to connect computing devices with a large number of storage devices. Management and modeling programs may be used to manage these complex computing environments.

Storage Management Initiative Specification (SMI-S), and Common Information Model (CIM) technologies, are widely used for managing storage devices and storage environments. CIM is described further below. The SMI-S is a standard management interface that allows different classes of hardware and software products to interoperate for monitoring and controlling resources. For example, the SMI-S permits storage management systems to identify, classify, monitor, and control physical and logical resources in a SAN. The SMI-S is based on CIM, and Web-Based Enterprise Management (WBEM) architecture. CIM is a model for describing management information, and WBEM is an architecture for using Internet technologies to manage systems and networks. The SMI-S uses CIM to define objects that represent storage entities such as Logical Unit Numbers (LUNs), disks, storage subsystems, switches, and hosts. (In many, but not all cases, the term "volume" or "logical volume" is interchangeable with the term "LUN".) CIM also defines the associations that may or may not exist between these objects, such as a disk being associated to a storage subsystem because it physically resides in the storage subsystem.

The CIM objects mentioned above may be managed by a CIM object manager (CIMOM). A storage management software application can use a CIM client to connect to a CIMOM, to retrieve information about the storage entities that the CIMOM manages, and also to perform active configuration of the storage entities. Storage management software that uses a CIM client may be called a CIM client application.

For example, SMI-S describes how a current storage LUN is mapped. A CIM server is a CIMOM and a set of CIM providers. The SMI-S describes several methods for assigning a LUN from a disk storage system to a host, or for adding a LUN to a disk storage system.

For example, the SMI-S describes how to add a LUN to a disk storage system, wherein the method CreateOrModifyElementFromStoragePool( ) in the StorageConfigurationService object is used to create a LUN (or storage volume) given the LUN type, the size of the LUN, a storage pool CIM object path and the StorageConfigurationService. The resulting LUN can then be assigned to a host or several hosts available to the disk storage system. Details of the CreateOrModifyElementFromStoragePool( )method are as follows:

CreateOrModifyElementFromStoragePool
uint32 CreateOrModifyElementFromStoragePool
{
  [in, Values {"Unknown", "Reserved", "StorageVolume", "StorageExtent", "DMTF Reserved","Vendor Specific"},
    ValueMap {"0", "1", "2", "3", "...", "0x8000..."}]
      uint16 ElementType; [out] CIM_ConcreteJob ref Job, [in] CIM_StorageSetting ref Goal, [in, out] uint64 Size, [in] CIM_StoragePool ref InPool, [out, in] CIM_LogicalElement ref Element};
  [out] CIM_ConcreteJob ref Job,
  [in] CIM_StorageSetting ref Goal,
  [in, out] uint64 Size,
  [in] CIM_StoragePool ref InPool,
  [out, in] CIM_LogicalElement ref Element)
};

This method allows an element of a type specified by the enumeration ElementType to be created from the input storage pool. The parameters are as follows:

ElementType: This enumeration specifies what type of object to create. StorageVolume and StorageExtents are defined as values.

Job: Reference to the completed job.

Goal: This is the service level that the storage volume is expected to provide. The setting must be a subset of the capabilities available from the parent storage pool. Goal may be a null value in which case the default setting for the pool will be used.

Size: As an input this is the desired size of the storage volume. If it is not possible to create a volume of the desired size, a return code of "Size not supported" will be returned with size set to the nearest supported size.

InPool: This is a reference to a source storage pool.

Element: If a reference is passed in, then that element is modified, otherwise this is a reference to the created element.

Generally, there is substantial complexity when using the CIM object model to create a LUN. For example, the StoragePool object does not have a direct association to the ComputerSystem's StorageConfigurationService, so the StoragePool object has to be first associated to the ComputerSystem, and the ComputerSystem then has to be associated to the StorageConfigurationService to associate a StoragePool to a StorageConfigurationService. Also, because the ComputerSystem can represent more than just a disk storage system, the correct ComputerSystem must be located before making the association to the StorageConfigurationService.

Developing and unifying management standards for desktop, enterprise and Internet environments is a main goal of the Distributed Management Task Force Inc. (DMTF). DMTF standards are platform-independent and technology neutral, and facilitate cost effective system management. The DMTF's CIM standard is an object-oriented management information model that unifies and extends existing management standards, such as for example, Simple Network Management Protocol (SNMP), Desktop Management Interface (DMI), and Common Management Information Protocol (CMIP). The CIM specification defines the syntax and rules of the model and how CIM can be integrated with other management models, while the CIM schema comprises the descriptions of the models.

The CIM standard schema may define thousands of classes with properties and associations for logical and physical modeling. The schema may represent one or many components of an information handling system including, but not limited to, fans, power supplies, processors, and firmware. The CIM schema class definitions also include methods. Organization of the classes is accomplished by use of namespaces, which function as logical databases. DMTF Profiles are specifications that define the CIM model and associated behavior for a management domain. The profiles define requirements regarding the classes and associations used to represent the management information in a given management domain. Generally, within a CIMOM, profiles are implemented by different providers in one or more namespaces. The CIMOM provides an interface, which allows a provider to expose the instances of CIM classes and a client application to read and/or write properties and invoke methods.

Many of the CIM methods include management tasks, such as, for example but not limited to, updates and diagnostics. Many of the methods and tasks/jobs may require a long period of time in order to be completed. As used herein, the words "task" and "job" may be used interchangeably. In a CIM environment, a provider may return a job handle to a client using the "Job" output parameter on the invoked CIM method, thereby effectively making the invocation asynchronous. The job handle may be represented by a CIM reference to an instance of a CIM class arbitrarily named CIM_ConcreteJob. The reference may be used at any time by a client to request an actual instance of CIM_ConcreteJob, and to check the status of a job.

DMTF also specifies CIM operations over HTTP, which include CIM multiple operations. A multiple operation is defined as one that requires the invocation of more than one CIM method. A multiple operation request is represented by a <MULTIREQ> element, and a multiple operation response by a <MULTIRSP> element. A <MULTIREQ> (respectively, <MULTIRSP>) element is a sequence of two or more <SIMPLEREQ> (respectively, <SIMPLERSP>) elements. A <MULTIRSP> element contains a <SIMPLERSP> element for every <SIMPLEREQ> element in the corresponding Multiple Operation Response, and these <SIMPLERSP> elements are in the same order as their <SIMPLEREQ> counterparts (so the first <SIMPLERSP> in the response corresponds to the first <SIMPLEREQ> in the request, and so forth).

Multiple operations provide a convenient mechanism whereby multiple method invocations may be batched into a single HTTP Message, thereby reducing the number of roundtrips between a CIM client and a CIM server and allowing the CIM server to make internal optimizations. Multiple operations do not confer any transactional capabilities in the processing of the request (for example, there is no requirement that the CIM server guarantee that the constituent method calls either all failed or all succeeded, only that the entity make a "best effort" to process the operation). However, servers process each operation in a batched operation to completion before executing the next operation in the batch. Thus the order of operations specified within a batched operation is significant.

In general, tasks such as assigning a LUN from a disk storage system to a host, and adding a LUN to a disk storage system, can be complex to execute. Other example tasks may include otherwise allocating storage, specifying the logical and/or physical devices used for the storage allocation, specifying whether the data should be replicated, the particular RAID level, and the like.

SUMMARY OF THE INVENTION

A method is used in controlling multi-step storage management operations. From a specification of a desired configuration of a data storage system, a description of a multi-step transaction for producing the desired configuration is derived. The description includes directions for reacting to results of an intermediate step within the multi-step transaction. Management operations are invoked based on the description.

BRIEF DESCRIPTION OF THE DRAWINGS

Features and advantages of the present invention will become more apparent from the following detailed description of exemplary embodiments thereof taken in conjunction with the accompanying drawings in which:

FIGS. 6-7, 11-14 are block diagrams of logic for multi-step processing that may be performed in connection with the techniques herein in an embodiment; and FIGS. 8-10 are examples illustrating user interface mechanisms that may be used with the techniques herein.

DETAILED DESCRIPTION OF EMBODIMENT(S)

Figure 1:
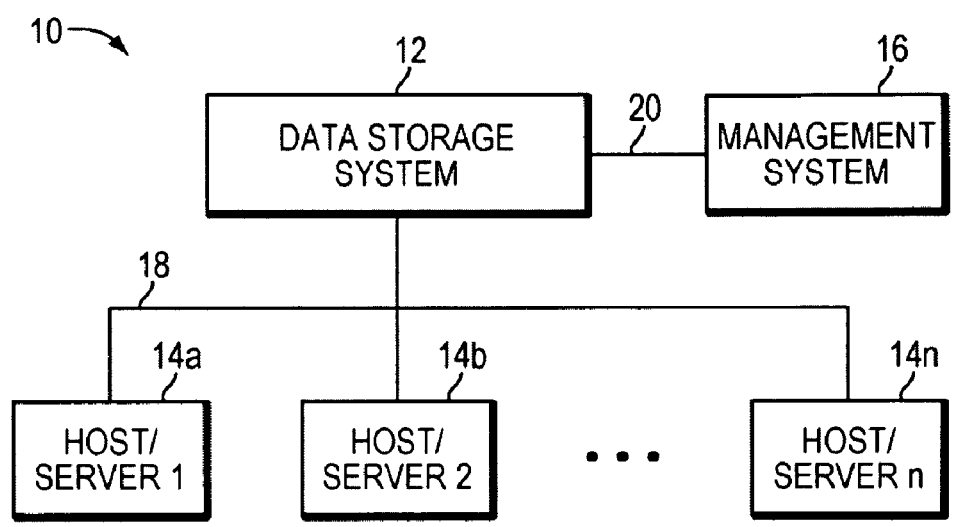
FIG. 1 is an example of an embodiment of a system that may utilize the techniques described herein.

As described below, a technique is provided that may be used in controlling multi-step storage management operations, particularly for providing a generic transactional service for CIM based multi-step array management operations.

Conventionally, traditional storage system management software requires storage administrators to manually perform a set of discrete operations to accomplish array management tasks. However, by use of the technique described herein, e.g., under a dual storage processor storage system environment as described below, a generic transaction service can be provided that can bundle a set of discrete CIM based management operations together, and automatically execute the bundle asynchronously as an inseparable entity. Also, use of an example implementation of the technique enables the storage system to automatically perform a set of pre-described operations on the user's behalf, thereby saving the user time in managing and configuring storage systems.

More particularly, traditional storage management software is conventionally based on an operation-centric model, requiring storage administrators to manually perform a set of discrete operations to accomplish a management task that addresses a specific business objective. A typical storage management task conventionally includes many discrete operations, is usually time-consuming to execute, and can potentially fail before the final step is finished, which can leave the storage system improperly configured. As storage venders continue to introduce more advanced features into storage systems, it also introduces complexity to storage management. Conventionally, insufficient ease-of use is provided in array management software.

Also conventionally, SMI-S has a Concrete Job concept, which defines a way to execute and retrieve status of a CIMOM background job asynchronously, and which does not define any transactional nature of each background job. The conventional CIM multi-request specification defines a way for the client to send multiple CIM requests using one network call; since conventional CIMOM based array servers do not consider a CIM multi request as a logical entity, requests are executed separately. Conventionally, customized scripts have been used by customers to execute a set of CLI commends automatically to accomplish a management task. The conventional scripting approach can be expensive to develop and difficult to maintain. Other conventional transactional service based software makes a transactional log on all operation regardless of whether the operation is successful or not, which requires constant writes to persistent storage, and introduces significant performance overhead. As the number of such writes increases, it also increases the likelihood of storage corruption.

By contrast, in accordance with an example implementation of the technique, a generic transaction service is provided that can bundle a set of discrete CIM based management operations together, and automatically execute the bundle asynchronously as an inseparable entity. This generic trans action service has at least the following innovative characteristics:

1. treating a set of discrete UM operations as a single transaction, while maintaining the status and progress of the transaction;
2. allowing automatic rollback to undo finished operations, e.g., if any irresolvable errors occur prior to task completion; also allowing the user to resume the unfinished operation, e.g., after the user fixes the hardware issue that caused the task (e.g., background task) to stop;
3. automatically resolving recoverable errors, and updating subsequent steps based on change and continuing planned operations;
4. allowing seamless failover between two storage processors, if the executing storage processor crashes or reboots; and
5. saving multi step transactional based operations in an xml file using SMI-S CIM multi-request format, facilitating integration with SMI-S complaint clients.

In at least one example implementation in accordance with the technique, the generic transaction service contains at least two logical components: a hierarchical task framework from which multi-step tasks can be derived, and an execution engine that drives and executes the business logic of pre-defined tasks. In the example implementation, the execution engine understands the abstraction of management tasks, providing a generic and adaptable framework for any storage management software, and the execution engine persists the content and status of each transaction based tasks.

Advantageously, in at least one implementation of the technique as described in more detail below, the transaction service based framework adds a transaction control feature to SIM-S based Concrete Job. Such an implementation also leverages the CIM multi request XML format which eases integration with SMI-S complaint clients, provides a generic way to bundle a set of discrete CIM requests into a single logic operation, which enables customers to predefine the steps of a storage management operation and automatically execute it on user's behalf. In the implementation, the framework is extendable and programmable, to provide flexible control of dependencies of multi operations included in the task.

Referring to FIG. 1, shown is an example of an embodiment of a computer system that may be used in connection with performing the technique described herein. The computer system 10 includes one or more data storage systems 12 connected to server or host systems 14a-14n through communication medium 18. The system 10 also includes a management system 16 connected to one or more data storage systems 12 through communication medium 20. In this embodiment of the computer system 10, the management system 16, and the N servers or hosts 14a-14n may access the data storage systems 12, for example, in performing input/output (I/O) operations, data requests, and other operations. The communication medium 18 may be any one or more of a variety of networks or other type of communication connections as known to those skilled in the art. Each of the communication mediums 18 and 20 may be a network connection, bus, and/or other type of data link, such as a hardwire or other connections known in the art. For example, the communication medium 18 may be the Internet, an intranet, network or other wireless or other hardwired connection(s) by which the host systems 14a-14n may access and communicate with the data storage systems 12, and may also communicate with other components (not shown) that may be included in the computer system 10. In one embodiment, the communication medium 20 may be a LAN connection and the communication medium 18 may be an iSCSI or fibre channel connection.

Each of the host systems 14a-14n and the data storage systems 12 included in the computer system 10 may be connected to the communication medium 18 by any one of a variety of connections as may be provided and supported in accordance with the type of communication medium 18. Similarly, the management system 16 may be connected to the communication medium 20 by any one of variety of connections in accordance with the type of communication medium 20. The processors included in the host computer systems 14a-14n and management system 16 may be any one of a variety of proprietary or commercially available single or multi-processor system, such as an Intel-based processor, or other type of commercially available processor able to support traffic in accordance with each particular embodiment and application.

It should be noted that the particular examples of the hardware and software that may be included in the data storage systems 12 are described herein in more detail, and may vary with each particular embodiment. Each of the host computers 14a-14n, the management system 16 and data storage systems may all be located at the same physical site, or, alternatively, may also be located in different physical locations. In connection with communication mediums 18 and 20, a variety of different communication protocols may be used such as SCSI, Fibre Channel, iSCSI, and the like. Some or all of the connections by which the hosts, management system, and data storage system may be connected to their respective communication medium may pass through other communication devices, such as a Connectrix or other switching equipment that may exist such as a phone line, a repeater, a multiplexer or even a satellite. In one embodiment, the hosts may communicate with the data storage systems over an iSCSI or a Fibre Channel connection and the management system may communicate with the data storage systems over a separate network connection using TCP/IP. It should be noted that although FIG. 1 illustrates communications between the hosts and data storage systems being over a first connection, and communications between the management system and the data storage systems being over a second different connection, an embodiment may also use the same connection. The particular type and number of connections may vary in accordance with particulars of each embodiment.

Each of the host computer systems may perform different types of data operations in accordance with different types of tasks. In the embodiment of FIG. 1, any one of the host computers 14a-14n may issue a data request to the data storage systems 12 to perform a data operation. For example, an application executing on one of the host computers 14a-14n may perform a read or write operation resulting in one or more data requests to the data storage systems 12.

The management system 16 may be used in connection with management of the data storage systems 12. The management system 16 may include hardware and/or software components. The management system 16 may include one or more computer processors connected to one or more I/O devices such as, for example, a display or other output device, and an input device such as, for example, a keyboard, mouse, and the like. A data storage system manager may, for example, view information about a current storage volume configuration on a display device of the management system 16, provision data storage system resources, and the like.

In one embodiment, the one or more data storage systems 12 of FIG. 1 may be an appliance with hardware and software for hosting the data storage of the one or more applications executing on the hosts 14a-14n. The appliance may include one or more storage processors and one or more devices upon which data is stored. The appliance may include software used in connection with storing the data of the hosts on the appliance and also software used in connection with configuring and provisioning the data storage for use by the hosts in connection with techniques described herein. As an example that may executed on the hosts 14a-14n, the data storage configuration and provisioning tasks may include allocating storage for user accounts or mailboxes, specifying the devices (logical and/or physical) used to store the email data, specifying whether data replication is performed for disaster recovery, configuring the physical devices in one or more RAID groups and other logical entities, and the like. Techniques that may be used in connection with performing data storage configuration, and configuration and provisioning tasks are described in more detail in following paragraphs in order to provide ease of use to customers of the data storage system(s) 12.

In connection with an embodiment in which the data storage 12 is an appliance including hardware and software, the appliance may also include other software for performing different data services. For example, the appliance may include backup server software which interacts with software on the hosts 14a-14n when performing a backup operation.

In another embodiment, the data storage systems 12 may include one or more data storage systems such as one or more of the data storage systems offered by EMC Corporation of Hopkinton, Mass. Each of the data storage systems may include one or more data storage devices, such as disks. One or more data storage systems may be manufactured by one or more different vendors. Each of the data storage systems included in 12 may be inter-connected (not shown). Additionally, the data storage systems may also be connected to the host systems through any one or more communication connections that may vary with each particular embodiment and device in accordance with the different protocols used in a particular embodiment. The type of communication connection used may vary with certain system parameters and requirements, such as those related to bandwidth and throughput required in accordance with a rate of I/O requests as may be issued by the host computer systems, for example, to the data storage systems 12. It should be noted that each of the data storage systems may operate stand-alone, or may also be included as part of a storage area network (SAN) that includes, for example, other components such as other data storage systems. Each of the data storage systems may include a plurality of disk devices or volumes. The particular data storage systems and examples as described herein for purposes of illustration should not be construed as a limitation. Other types of commercially available data storage systems, as well as processors and hardware controlling access to these particular devices, may also be included in an embodiment.

In such an embodiment in which element 12 of FIG. 1 is implemented using one or more data storage systems, each of the data storage systems may include code thereon for performing the technique as described herein.

Servers or host systems, such as 14a-14n, provide data and access control information through channels to the storage systems, and the storage systems may also provide data to the host systems also through the channels. The host systems may not address the disk drives of the storage systems directly, but rather access to data may be provided to one or more host systems from what the host systems view as a plurality of logical devices or logical volumes (LVs). The LVs may or may not correspond to the actual disk drives. For example, one or more LVs may reside on a single physical disk drive. Data in a single storage system may be accessed by multiple hosts allowing the hosts to share the data residing therein. An LV or LUN (logical unit number) may be used to refer to the foregoing logically defined devices or volumes. Data storage devices may also be configured using other logical device layers on top of the LV or LUN which are then exposed to the host or other component using the configured data storage.

In following paragraphs, reference may be made to a particular embodiment such as, for example, an embodiment in which element 12 of FIG. 1 is an appliance as described above. However, it will be appreciated by those skilled in the art that this is for purposes of illustration and should not be construed as a limitation of the techniques herein.

Described in following paragraphs are techniques that may be used to assist customers of a data storage system in connection with performing data storage system management tasks such as related to data storage system configuration, provisioning of data storage, and the like. However, the described applications and implementations are only examples; the techniques herein may be adaptable to other applications and/or to the particular knowledge level of the user.

In particular, the techniques are flexible and allow for implementation of best practices and defaults in an automated fashion which, for example, may be customized for the user or customer and/or underlying data storage system and environment to meet specific customer needs.

What will be described herein are example techniques that may be used in connection with performing data storage configuration and provisioning of the data storage in connection with a request, for example, to allocate a portion of data storage for use with an application hosting data on a data storage system.

Figure 2:
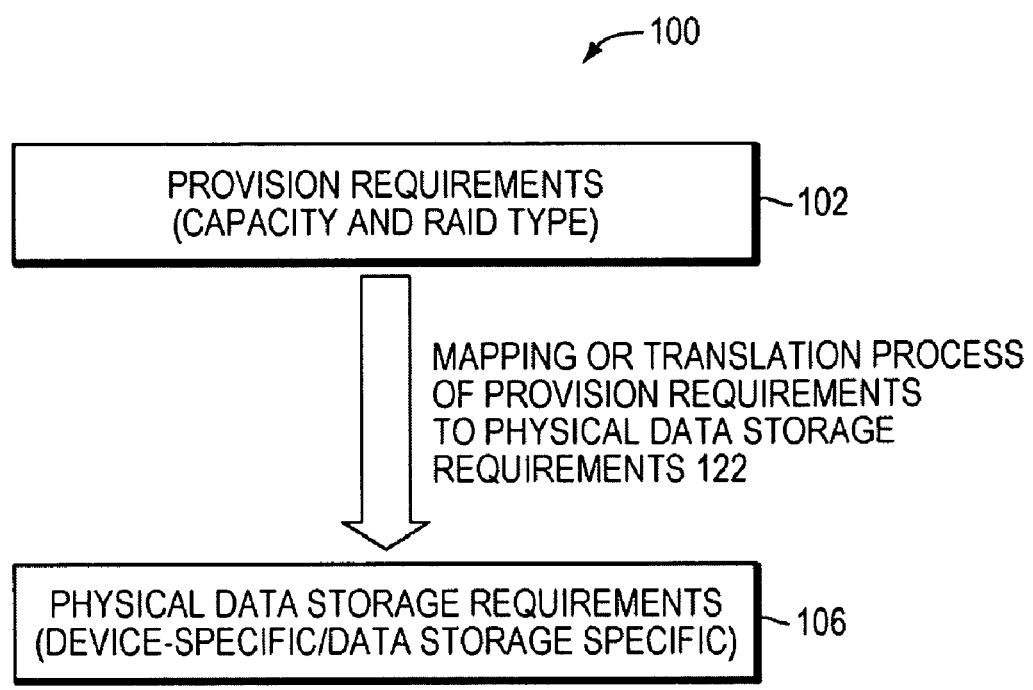
FIG. 2 is an example representation of processes that may be performed in an embodiment in accordance with the techniques herein.
Figure 8:
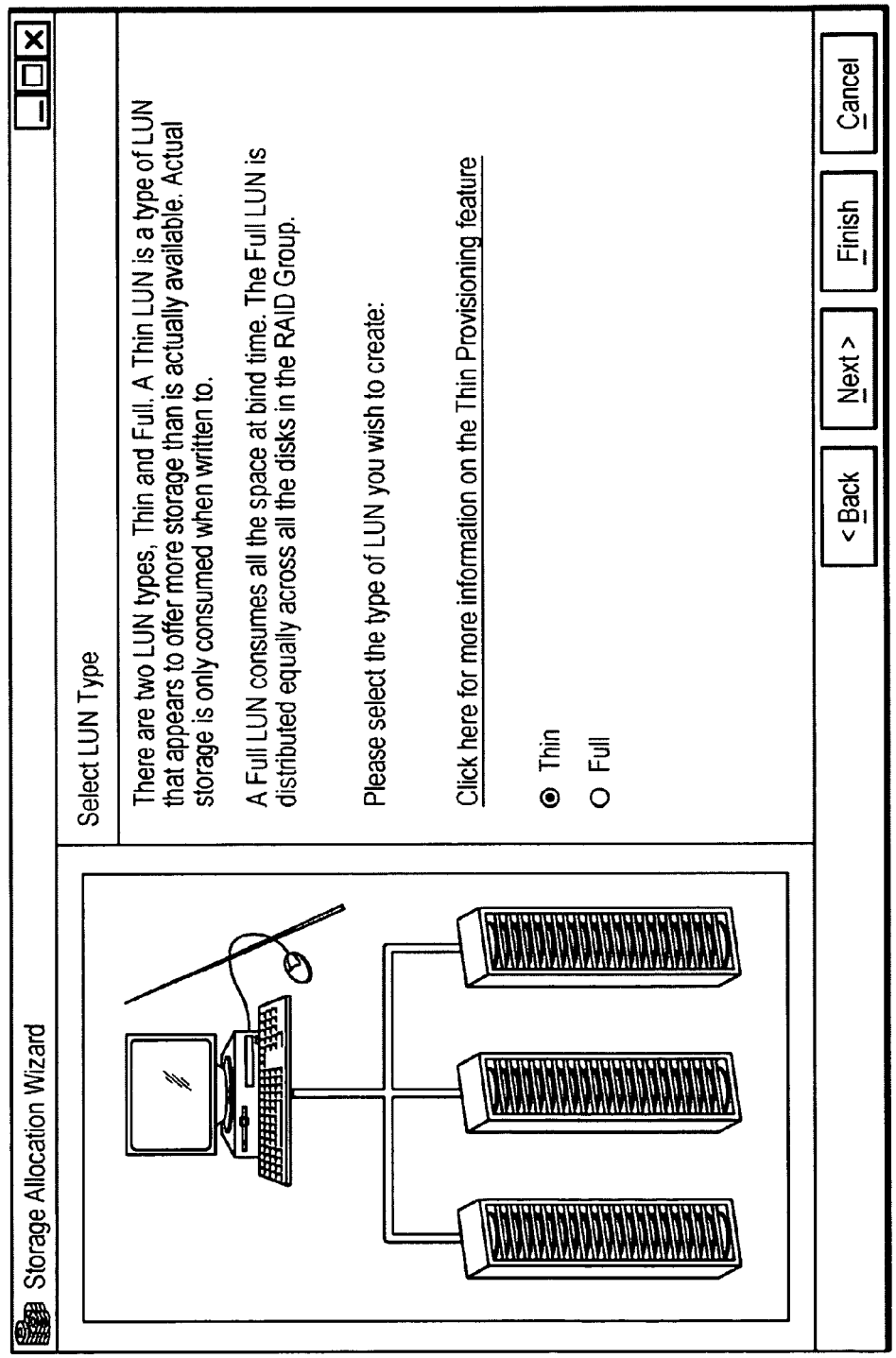

Referring to FIG. 2, shown is an example representation of the processing that may be performed in an embodiment in accordance with the techniques herein. The example 100 illustrates the processing that may be performed in connection with a request to provision storage of a data storage system. For example, as illustrated by example in FIGS. 8-10, a provisioning request may be made to allocate storage for a particular capacity and RAID type. The example 100 includes provision requirements 102 which may be mapped or translated into physical storage requirements 106 in a mapping or translation stage 122. The mapping stage 122 may be performed in accordance with data storage best practices. The steps comprising stage 122 may vary with each situation and may vary with the particular underlying data storage system.

The best practices implemented as part of 122 in an embodiment may be based on experience, know-how, testing, and the like, in connection with provisioning and configuring storage for a particular data storage system. The mapping performed in the stage 122 may vary with each data storage system provided by a same vendor or different vendor. For example, EMC Corporation provides the Symmetrix® data storage system and the CLARiiON® data storage system. A different set of processing steps may be performed for each of the foregoing data storage systems in accordance with data storage system specific best practices in connection with the stage 122. The best practices may be codified in accordance with techniques herein to provide for automatically provisioning data storage system resources. An embodiment utilizing the techniques herein may implement the best practices using executable code which is executed on the data storage system when processing a request to provision storage and/or configure storage for use with the techniques herein. As will be described in more detail herein, the best practices may be codified using any one of a variety of different techniques known in the art such as, for example, using a script language, rules, programming language, and the like. Although reference may be made to particular ways in which the techniques herein may be implemented for purposes of example and illustration, such reference should not be construed as a limitation of the techniques herein.

The requirements 102 and the mapping stage 122 will now be described in more detail.

The provision requirements 102 may specify the one or more provisioning requirements for a request. The provision requirements 102 may be the user inputs for the provisioning request received via a user interface (UI) using any one of a variety of different supported interfaces and techniques (e.g., see FIGS. 8-10). The provision requirements 102 may vary with user level for which the provisioning request is issued.

In one embodiment, the UI may provide for one or more different types of user interfaces and associated data. For example, the UI may provide support for a graphical user interface (GUI), command line interface (CLI), and the like. As also described herein, one or more different user levels may be provided in accordance with different levels of user proficiency. A user may interact with a system utilizing the techniques herein at any one of the user proficiency levels. The provision requirements 102 may vary with each of the different user proficiency levels of interaction that may be provided in an embodiment. Each of the different user levels may provide a different logical view and level of abstraction with respect to a data storage task to be performed. Each of the different user levels may provide a different level of detail with respect to the underlying operations and tasks performed on the data storage system in accordance with different levels of user sophistication and knowledge. The language or terminology of the UI and provision requirements 102, UI data (e.g., content or data used to populate the UI menus), and UI presentation or structure (e.g., commands presented or particular hierarchical menu structure) may vary in accordance with the particular user level at which a user interacts with the data storage system. Thus, a user may interact with the data storage system at a variety of different levels when issuing data storage configuration requests. The UI and provision requirements may be customized for the particular level for which the request is performed.

The physical storage devices of the data storage system may be configured or partitioned into storage pools for use in connection with specifying requirements of 102. An embodiment may form one or more such storage pools for use in connection with servicing a provisioning request prior to the issuance of the provisioning request. In other words, the physical storage devices may be configured into one or more storage pools at a first point in time. At a second later point in time, storage may be allocated from the previously formed storage pools in connection with a provisioning request to allocate storage on the data storage system. Storage pools may be formed at different points in time in connection with the life cycle of a data storage system and a defined policy. For example, storage pools may be formed as part of data storage system initialization and startup processing and when new data storage devices are added to a data storage system. An embodiment may also form storage pools as part of processing in response to receiving a provisioning request.

Figure 3:
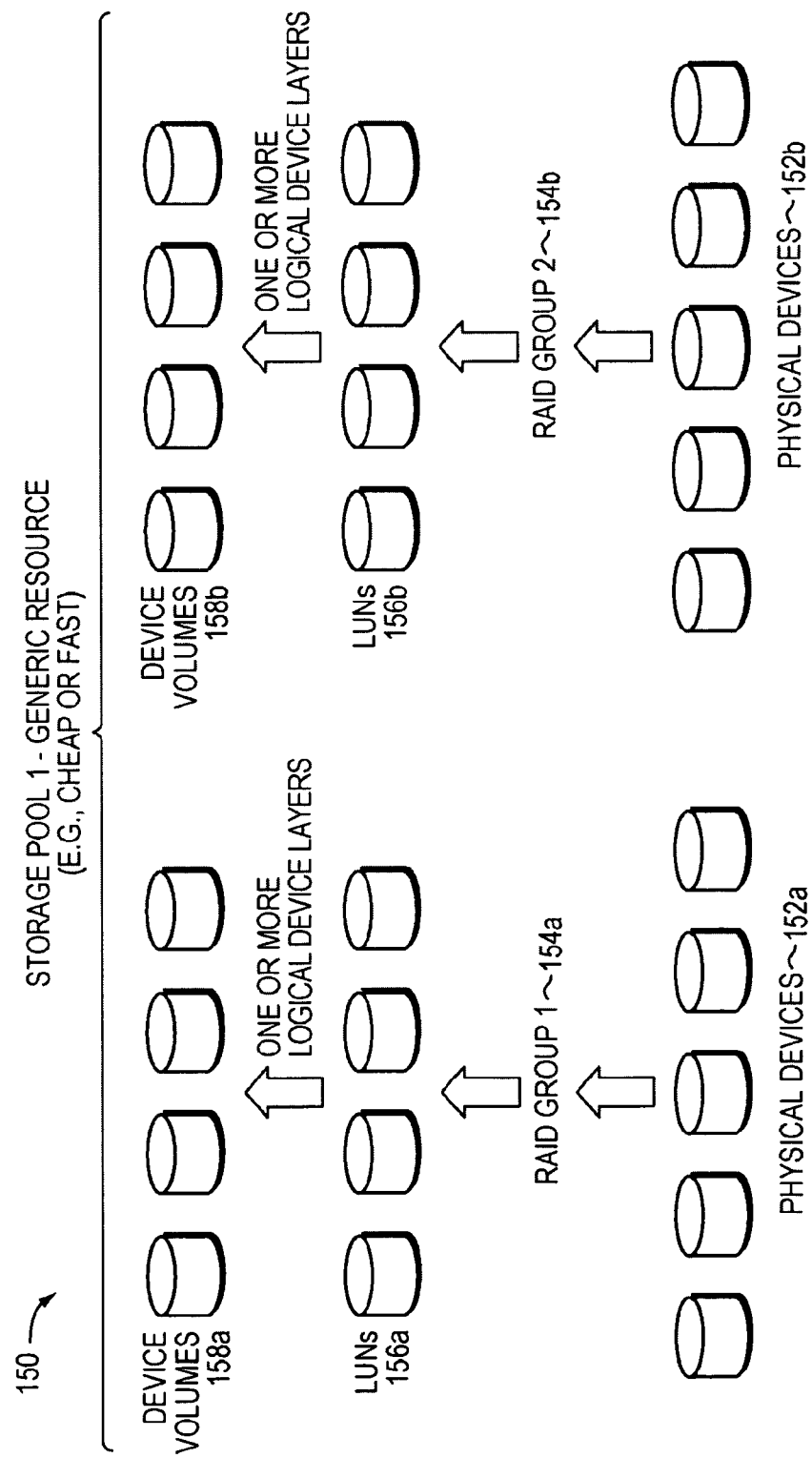
FIG. 3 is an example representation of how storage pools may be configured from physical devices in an embodiment.

Referring to FIG. 3, shown is an example representing how data storage system best practices may be used to form storage pools. The example 150 illustrates how storage pools may be constructed from groups of physical devices. For example, RAID Group 1 154a may be formed from physical devices 152a. The data storage system best practices of a policy may specify the particular RAID level and configuration for the type of storage pool being formed. For example, for physical devices 152a on a first data storage system type when forming a high performance ("FAST") storage pool, RAID-5 may be used in a 4+1 configuration (e.g., 4 data drives and 1 parity drive). The RAID Group 1 154a may provide a number of data storage LUNs 156a. An embodiment may also utilize one or more additional logical device layers on top of the LUNs 156a to form one or more logical device volumes 158a. The particular additional logical device layers used, if any, may vary with the data storage system. It should be noted that there may not be a 1-1 correspondence between the LUNs of 156a and the volumes of 158a. In a similar manner, device volumes 158b may be formed or configured from physical devices 152b. The storage pool 1 of the example 150 illustrates two RAID groups being used to define a single storage pool although, more generally, one or more RAID groups may be used for form a storage pool in an embodiment using RAID techniques.

The data storage system best practices may define how to configure or form the generic storage pools, each storage pool having an associated generic storage pool type. FIG. 3 illustrates one methodology or framework that may be used to form storage pools in an embodiment. In an embodiment following the methodology of FIG. 3, each underlying data storage system may have associated best practices specifying how to configure storage pools formed from physical devices in that particular data storage system. For example, different data storage systems may have varying best practices in connection with forming a FAST or low cost ("CHEAP") RAID group.

Figure 4:
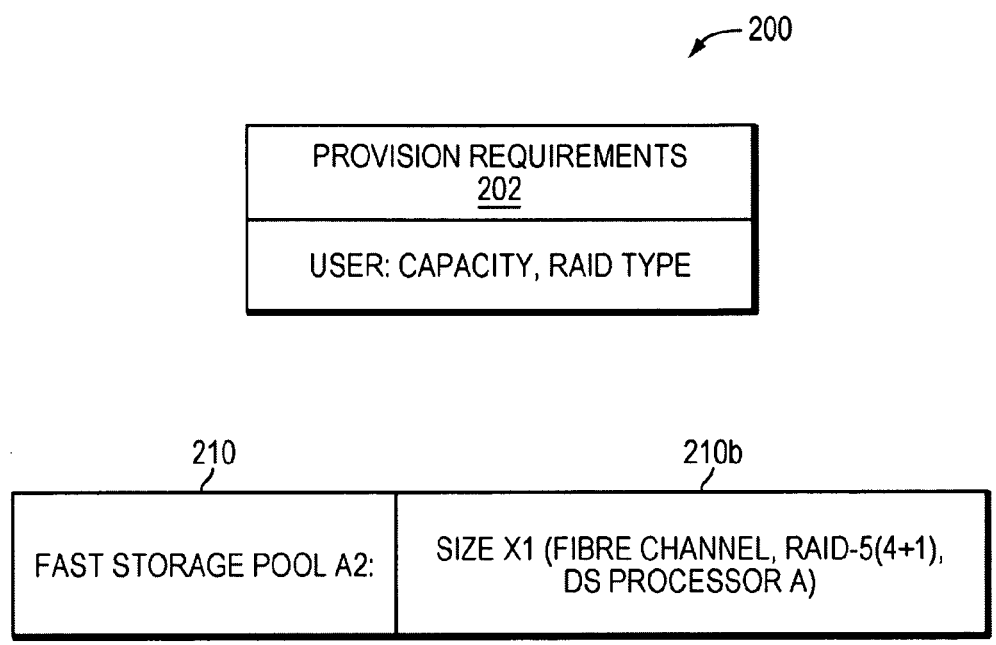
FIGS. 4-5, 15-18 are examples illustrating use of the techniques herein in connection with provisioning storage in an embodiment.

Referring to FIG. 4, shown is an example illustrating use of the techniques herein with the mapping processing as described in connection with FIG. 1. The example 200 includes provision requirements 202 which are input. In this example, the requirements of 202 include a capacity and a RAID type. The user may be requesting that storage be allocated for 5 gigabytes. The best practices may be codified using a script, rules, programming language, and the like, which map the requirements of 202 to storage resource requirements. The currently available resources of the data storage system are examined to see whether the provisioning request may be implemented, i.e., the current state of available resources on the data storage system is examined to determine whether it is possible to allocate resources as needed. It may be that there are insufficient resources available on the data storage system.

Element 210 may represent a storage pool configured from the physical devices of the data storage system. In other words, element 210 may represent a storage pool configured from the physical devices as illustrated in FIG. 3 in accordance with data storage system best practices. Element 210 includes FAST storage pool A2 of SIZE X1. For purposes of illustration, a policy may be in effect which defines FAST storage as preferably formed from Fibre channel devices, and CHEAP storage formed from ATA (Advanced Technology Attachment) devices. 5 Fibre channel drives may be included in the data storage system and processing may be performed to configure these 5 drives into storage pools for use with the techniques herein. In accordance with data storage system best practices, to make use of all 5 drives, a RAID 5 configuration of 4 data drives and 1 parity drive may be preferred. As such, the code implementing the data storage system best practices may result in formation of the FAST storage pool A2. It should also be noted in this example that the data storage system for which the foregoing best practices are defined may be a multiprocessor architecture so that a different data storage system processor may be assigned to service I/O requests in accordance with the FAST or CHEAP storage pool type. In this example, data storage system processor A may be used to service I/O requests for the FAST storage pools and processor B may be used to service I/O requests for a CHEAP storage pool. It may known that processor A may be used to only service the FAST storage pool and processor B may used to service the CHEAP storage pool as well as perform other processing tasks in the data storage system. Thus, such a processor assignment may serve as a factor in the I/O processing rate for the FAST storage pools being higher than that associated with the CHEAP storage pool. In connection with 210, FAST storage pool A2 currently has SIZE X1 amount of storage capacity available for use. Additional properties for the storage pool are indicated in area 210b.

As described below, it may not be initially possible to implement a provisioning request due to resources on the data storage system being insufficiently available or operative. In such instances, processing may be performed to indicate an error or status and recommend installation of additional storage devices in the data storage system in accordance with best practices. However, an embodiment may perform other alternatives and processing.

Figure 5:
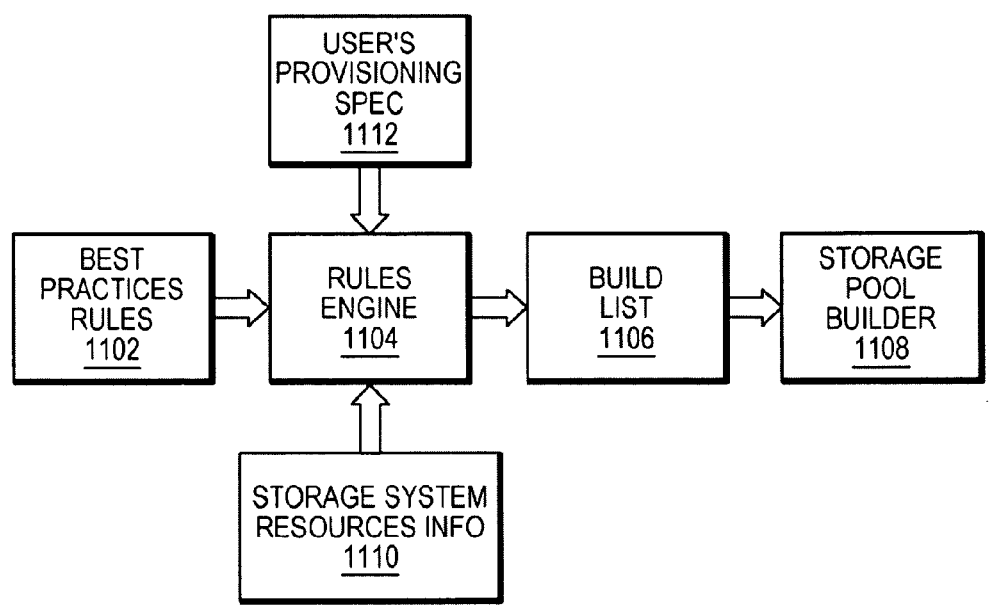

Referring to FIG. 5, shown is an example implementation of stage 122 above in which a rules engine 1104 may be used to derive a build list 1106 from best practices rules 1102, a user's provisioning specification 1112 (which may be, include, or be included in requirements 202 above), and storage system resources information 1110. The build list 1106 may then be used by storage pool builder logic 1108 to satisfy the user's provisioning specification by creating the storage pool. Rules engine 1104 is interprets best practices rules 1102. Best practices rules 1102 operated on by the engine 1104 may be stored in a database. The rules engine 1104 may employ one or more different representations or methods (from a simple look-up table to a complex knowledge based system) in making the build list. Storage system resources information 1110 includes information normally maintained about the storage system about its resources including the locations and types of disks installed in the storage system.

Figure 6:
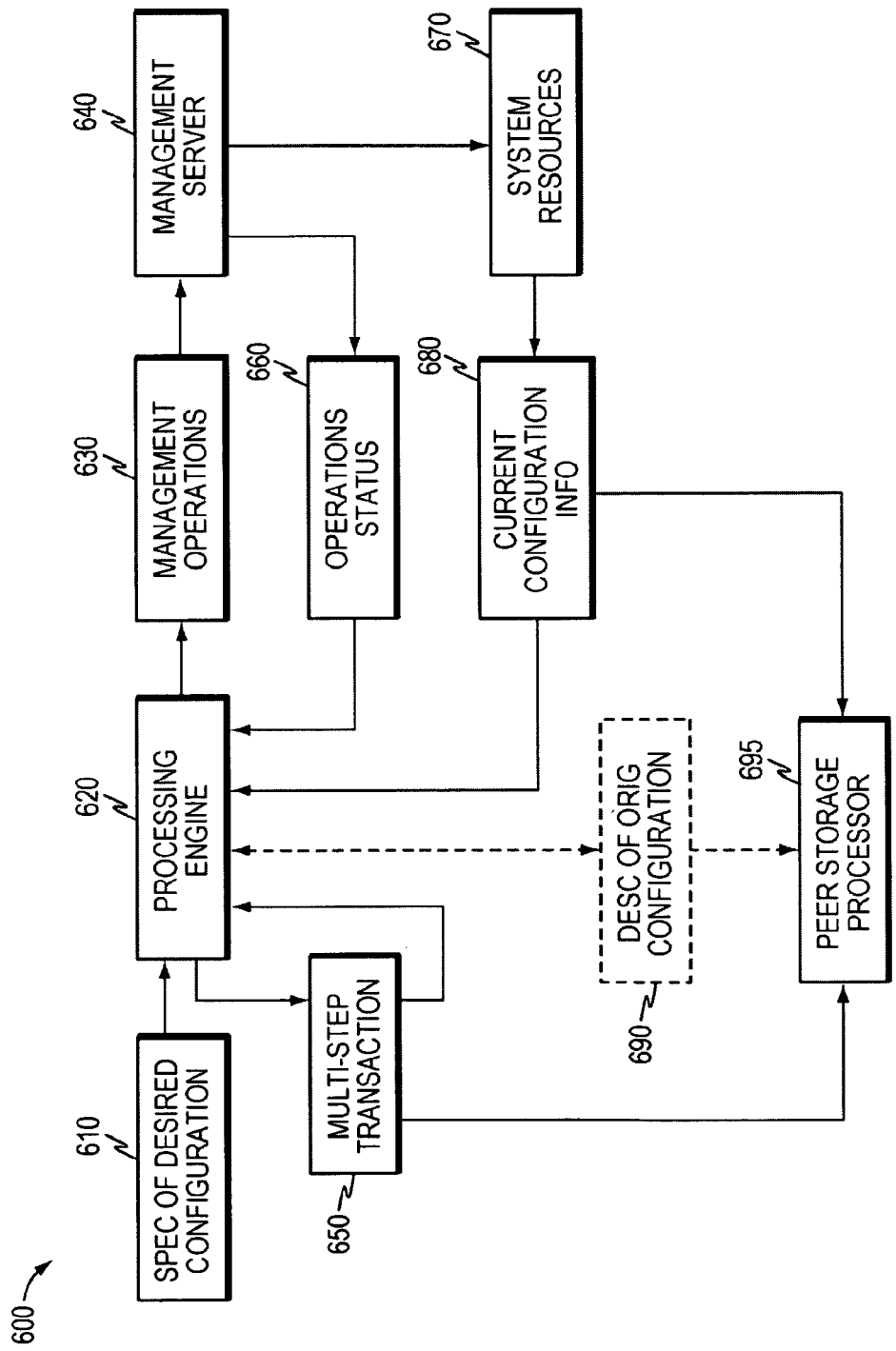

FIG. 6 illustrates a block diagram of logic 600 of an example implementation in accordance with the technique that may be used in controlling multi-step storage management operations. Logic 600 may be, include, or be included in storage pool builder logic 1108. Specification of desired configuration 610 may be, include, or be included in build list 1106. Processing engine 620 may be, include, or be included in the generic transaction service, and may implement at least a portion of the hierarchical task framework and the execution engine.

Based on the hierarchical task framework, processing engine 620 derives, from specification 610, a multi-step transaction description 650 described in more detail below. Description 650 describes steps of management operations and associated logic. In an orderly transaction based on description 650 and current configuration information 680 about system resources 670, engine 620 directs management server 640 to execute management operations 630 applied to the system resources 670 to change the configuration of the system in accordance with specification 610. Management server 640 may be, include, or be included in a CIMOM. Management server 640 provides operations status 660 back to engine 620 which may indicate, for example, the success or failure of each operation 630 on a current basis. Based on status 660 and the associated logic of description 650, engine 620 can take any of various status-based actions during the orderly transaction including, for example, pausing or canceling execution of the orderly transaction, prompting the user to make a decision, provide input, or take action, or causing execution of other management operations, e.g., operations reversing one or more of already executed operations 630.

Logic 600 may include failover capability with respect to the orderly transaction. For example, in an EMC data storage system in which at least some of logic 600 is implemented by a storage processor that has a peer storage processor 695 for redundancy in the data storage system, if the storage processor fails before completing the orderly transaction, peer storage processor 695 can take over and carry on. Processor 695 has access to description 650 and current configuration information 680. Thus, processor 695 can determine from information 680 which steps, if any, of the orderly transaction have already been completed, and what remains to be done.

With respect to taking actions during the orderly transaction, such actions may include undoing one or more of the completed steps of the orderly transaction, i.e., partially or completely rolling back the configuration. Reasons for doing so may include status 660 or information 680 indicating an error or condition in the system that requires such rollback, or user choice to undo the orderly transaction.

Rollback may be accomplished in any of multiple different ways. In at least one implementation, before the orderly transaction is begun, a description of the original configuration 690 is recorded so that an orderly transaction can be completely undone by deriving a new orderly transaction from description 690 that, when processed completely, produces the original configuration. In another implementation, partial or complete rollback is achieved incrementally by reversing each step of description 650 in order starting with the most recently completed step.

Figure 7:
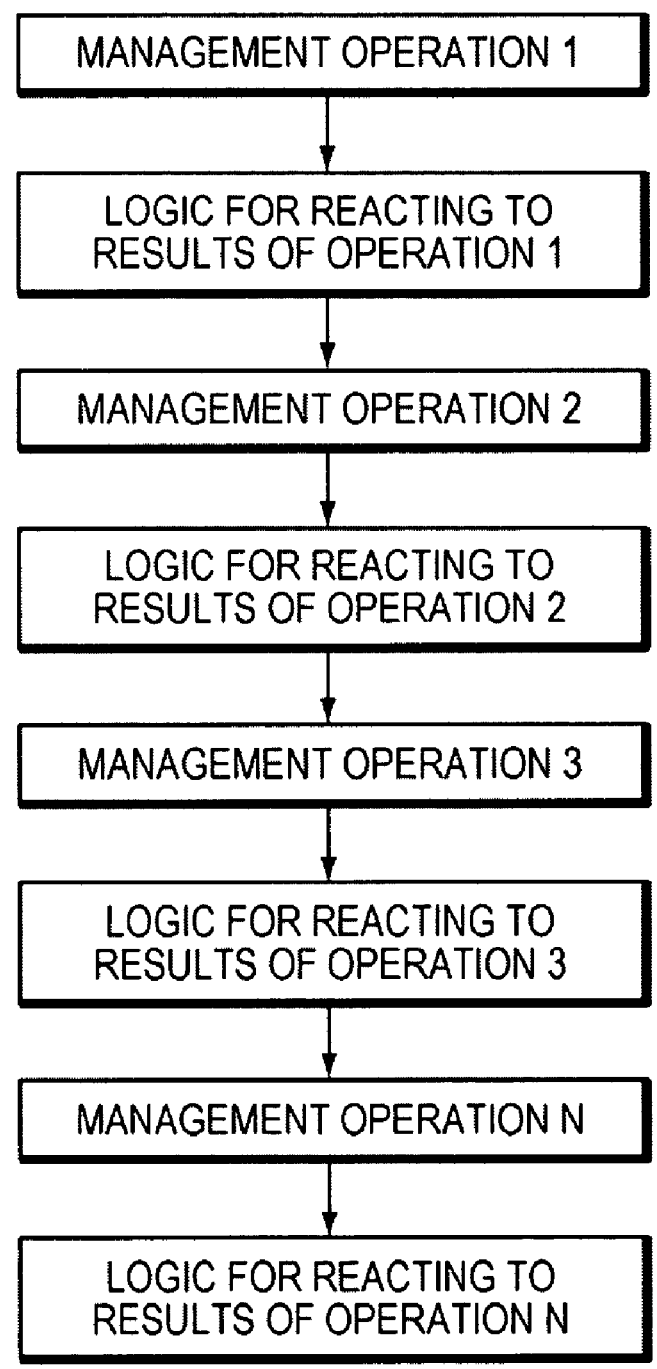

FIG. 7 illustrates an example implementation of description 650. Each management operation shown represents a step that may be, include, or be included in one or more CIM operations (a typical CIM operation being one to create a RAID group). The logic between the management operations helps control the flow of the orderly transaction and actions based on the orderly transaction, in reaction to status 660 as updated by server 640. Thus, for example, if the second management operation returns an error in status 660, the logic for reacting to the results of the second management operation may direct one or more actions depending on the nature of the error, including one or more of the status-based actions described above.

Thus, at least one implementation of the technique allows management operation actions or decisions that were conventionally taken by the user to be taken automatically in an orderly transaction, e.g., in a backend of the data storage system instead of from the host or through a management-oriented user interface, and the orderly transaction can be executed as a background process in the backend.

The hierarchical framework allows engine 620 to derive, from specification 610 that does not take into account how to implement the desired configuration, description 650 which includes a step by step to do list of operations that do so implement. In other words, specification 610 describes an end result that is desired (e.g., to satisfy a provisioning request), and description 650 lays out a procedure for an orderly transaction to take the data storage system to that end result. For example, specification 610 may require new RAID groups and new LUNs, and based on the hierarchical framework, description 650 directs that a new RAID group needed for the creation of one of the new LUNs is actually created before an attempt is made to create the new LUN.

The hierarchical framework may be extended to allow other configuration characteristics, such as mirroring, to be included in specification 610 and handled properly in the steps of description 650 so that steps are executed in the correct order for achieving such characteristics.

Specification 610 may be, include, or be included in an xml file that lists CIM messages describing the desired configuration. Engine 620 reviews the messages and produces description 650 that help ensure that internal steps are coordinated and that operations are done in order, to link correlations, and bundles them together.

The logic for reacting to results of operations (FIG. 7) may specify what happens when a step fails, e.g., a consequence or a recovery plan, and may specify skipping one or more management operations within the orderly transaction, e.g., if information 680 indicates that the system is already in the state that would be produced by such operations. The logic may also allow the orderly transaction to be paused upon discovery of a correctable error (e.g., a bad disk) and restarted once the user has taken corrective action (e.g., replaced the disk).

With respect to failover, at least one implementation of the technique relies on reading the system condition (e.g., information 680) to determine whether a step of the orderly transaction has been completed, which avoids maintaining a log which uses resources and is prone to data corruption.

The technique may be used not just in a data storage provisioning environment or towards ease of us but also in any situation in which management operations need to be executed in an orderly, step by step, transactional fashion to achieve a particular result.

Figure 11:
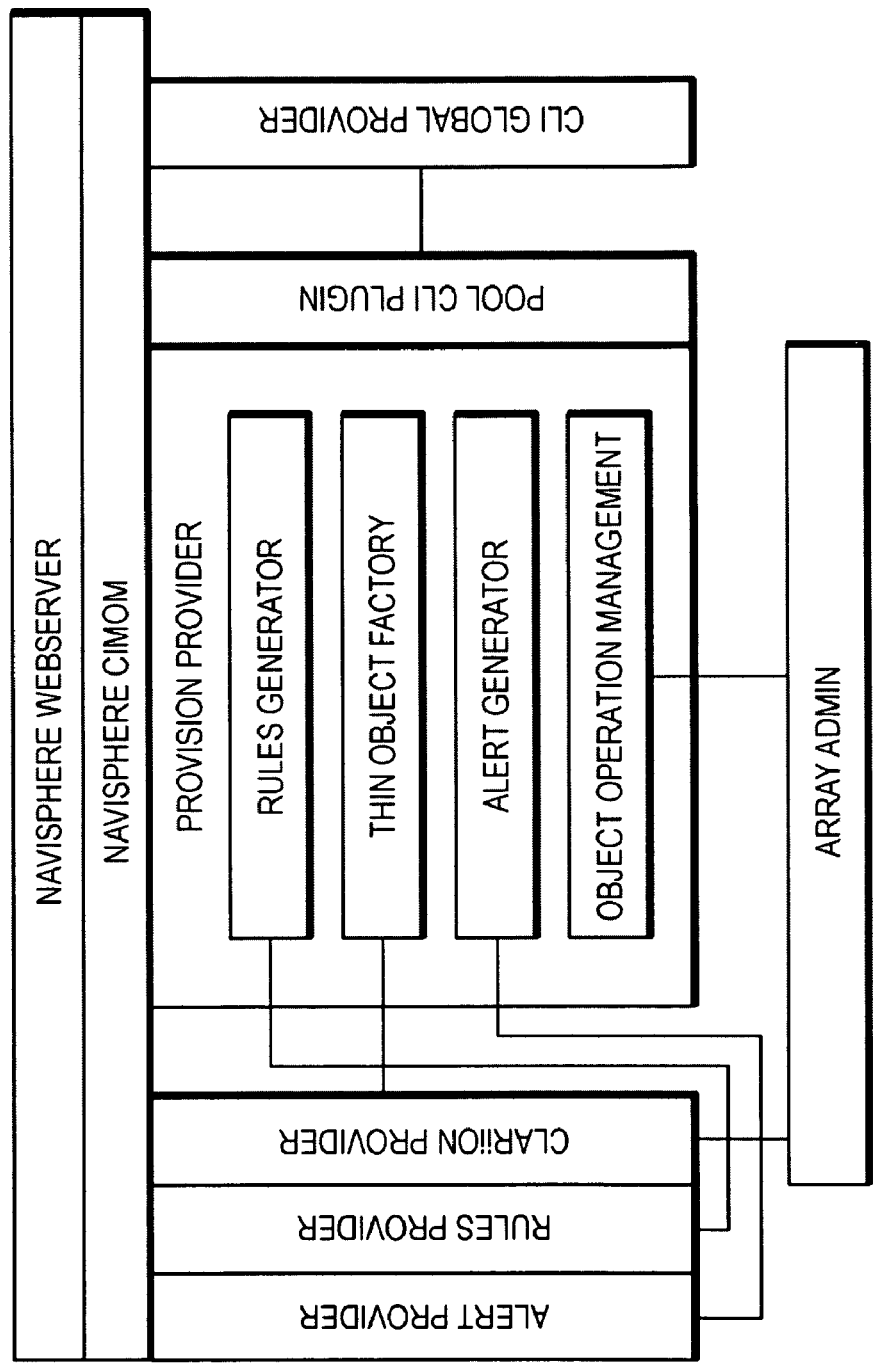

The following and FIGS. 11-18 describe a specific example illustrating use of the technique in a data storage system, specifically a data storage system having management functionality denoted Navisphere. In a provision provider architecture, an existing Navisphere framework provides a highly flexible interface to plug in new feature implementation in the server with little change to the existing implementation. With reference to FIG. 11, a new thin provisioning feature is implemented in a new provider software module denoted provision provider. The provision provider includes three functional modules:

1. Management of all the logical components of a thin provisioning feature, encapsulated in the following modules.
   a. Object Operation Management
This module translates user requests into tag length data (TLD) requests to create, modify and remove thin provisioning feature objects.
   b. Thin Object Factory
This module retrieves information from an Admin layer to populate thin provisioning feature objects in an object pool.
   c. Alert Generator
Alert generator checks predefined alterable conditions upon completion of a poll. It communicates with an alert provider to generate alerts.
2. Rules implementation that determines how disk pools and thin pools should be created based on best practices. This function is encapsulated into a rules generator, which acts as a client of a rules provider to define the topology of thin pools. At least one implementation of thin provisioning rules is a DLL that can be plugged into the rules provider framework.
3. A CLI plugin module that supports secure command line interface (CLI) commands that manage thin provisioning features.

FIG. 11 depicts the overall architecture of the provision provider. The provision provider interacts with a CLARiiON provider, a CLI global provider and the rules provider, to carry out the functions described above.

Figure 12:
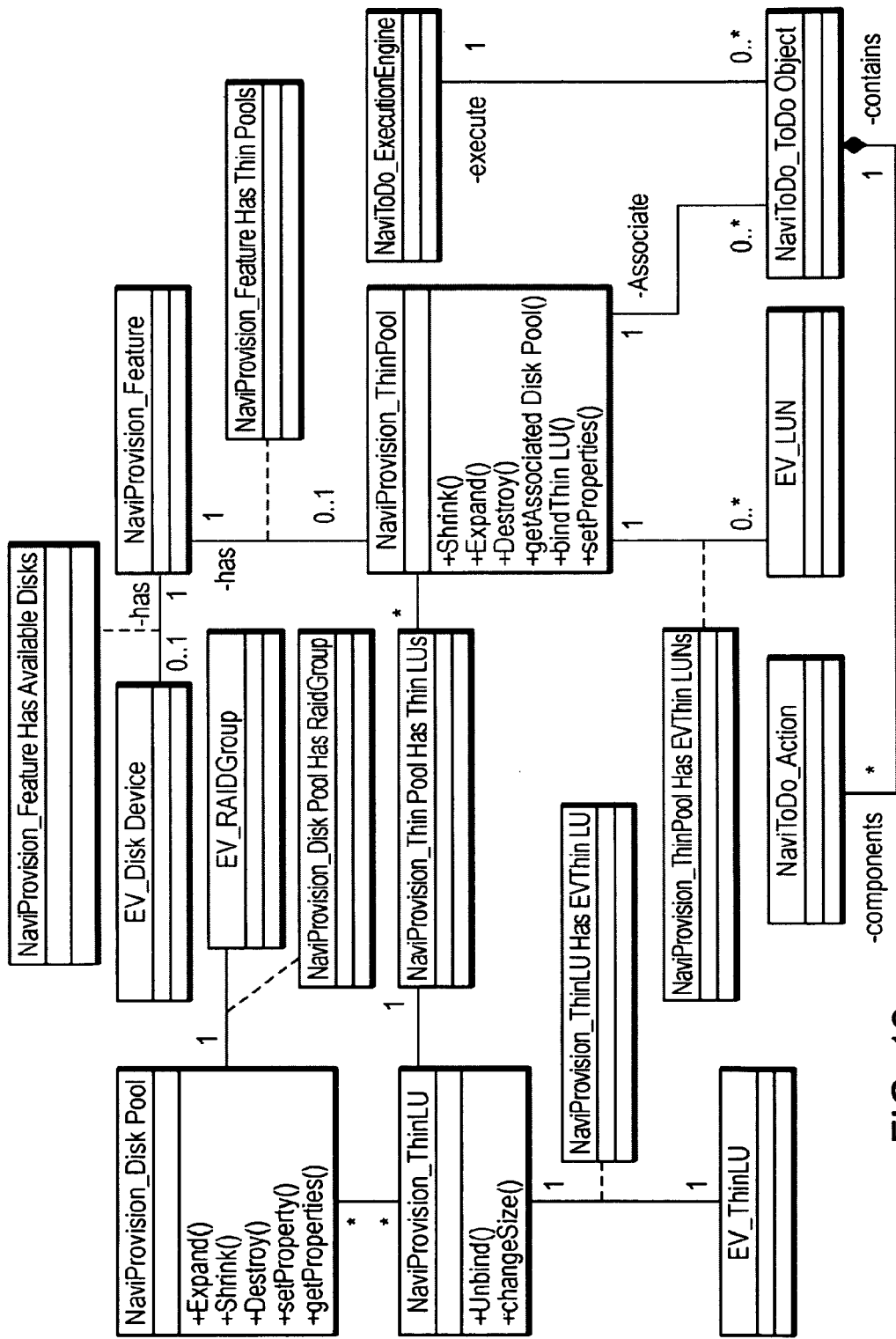

With respect to management of thin provisioning feature objects, and a provision provider class model, FIG. 12 shows a Unified Modeling Language (UML) diagram of the major classes of the provision provider.

Class NaviProvision_DiskPool has a one-to-many association with NaviProvision_ThinPool. This reserves the flexibility to support creating multiple thin pools to a disk pool. The association is defined as composition meaning that all component objects, NaviProvision_ThinPool, are deleted if the object of the container class is removed. Core Admin does not provide the association from a Disk Pool to a Thin Pool. However, Thin Admin provides an association from a Thin Pool to a Disk pool by having a disk pool ID as a property of a Thin Pool object. The Provision Provider needs to enumerate all Thin Pool objects to derive DiskPool-to-ThinPool associations.

The association between NaviProvision_ThinLU and NaviProvision_ThinPool is provided by the Thin Driver and defined as one-to-many composition. NaviProvision_ThinLU is a concrete class that models ThinLU in the Provider world. It has a one-to-one association with EV_ThinLU. Different from EV_ThinLU, which serves as a lightweight representation of ThinLU in Raid++ world, NaviProvision_ThinLU is provided to encapsulate all ThinLU properties.

NaviToDo_ToDoObject is a concrete class that controls any thin pool operations that require multi-step transactions. It has an one-to-one association with NaviProvision_ThinPool. The major function of this class is to bundle a set of discrete operations into a single transaction. Internally, a ToDoObject contains a list of NaviToDo_Action objects which models various actions that the provider has to execute. NaviToDo_ExecutionEngine is a singleton class. It executes actions defined in the NaviToDo_Action objects. It also handles various error conditions during the operation and drive rollback and roll forward operations.

With respect to thin pool management operations, thin pools are built on top of many legacy array logical components, such as RAID groups and data storage operating system ("Flare") logical volumes referred to as Flare LUNs or FLUs. Thin pool management operations involve multi-step processes to create, modify and delete these legacy array components. Because of the complexity of these multi-step processes, depending on the implementation, the admin layer may not encapsulate them into single TLD transactions.

A generic "ToDo" object (also referred to as TODO object) carries out the transactions of thin pool management operations. The implementation divides one thin pool management operation into a set of discrete actions, and encapsulates them into a TODO object. When a thin pool management operation is initiated, the provision provider creates a TODO object and immediately save it in persistent storage.

If execution of a TODO object encounters any unrecoverable errors, the provision provider rolls back to remove temporary objects created before finishing the pool management operation. If the CIMOM crashes during the operation, after the CIMOM restarts, the provision provider loads the TODO object into memory and automatically starts to execute unfinished operations.

With respect to a Navi ToDo list framework, Navi ToDo list is a generic transaction service that bundles a set of discrete management operations together, and automatically execute it asynchronously in the background as an inseparable entity. This generic transaction service has the following characteristics:

1. It treats a set of discrete operations as a single transaction, and maintains the status and progress of the transaction.
2. It rolls back to undo finished operations, if any irresolvable errors occur before finishing the last operation of the task.

3. It automatically resolves any recoverable errors and continue planned operations.
4. It fails over to surviving storage processor, if the executing processor crashes.
5. It seamlessly resumes operation following a shutdown/reboot.

The implementation of this transaction service contains two logical components, a hierarchical task framework from which someone can derive their own multi-step tasks, and a transaction execution engine which drives and executes the business logic of any predefined tasks. These two components are independent software modules which share mutually agreed generic interfaces. The transaction execution engine only understands the abstraction of all the management tasks, so that it becomes very generic and can be easily adopted by any storage management software. The separation of these two components enables dynamic change of the execution content of the ToDo List without requiring changing the ToDo list execution engine.

The provision provider utilizes a Navi ToDo list framework to orchestrate all thin pool management operations. Described below is the structure of the ToDo list, including class level design details. Thin pool creation is used to demonstrate how the ToDo list is used to accomplish transaction based thin pool operations With respect to the structure of the ToDo list, a Navi ToDo list is a list of predefined Actions and a Control Header. The Control Header includes information such as: Operation Time Stamp, Operation State, Target Object ID, Progress of the operation and operation error state. The ToDo actions are extended from an abstract Interface, NaviToDo_Action. Each action can be used to encapsulate a specific operation to a manageable array object, such as a RAID group, a LUN or a disk. For example, BindLUN action encapsulates all the information needed to create a LUN on a storage system. NaviToDo_Action is characterized using a generic CIM simple request.

FIG. 13 shows the structure of ToDo list.

With respect to storage processor owner, since the ToDo object is visible to both SPs, only the owner SP can execute the actions predefined in the TODO object. Ownership of a ToDo object may be trespassed to the peer surviving SP, if the owner SP becomes unavailable. When the owner SP is down, the execution of the ToDo list is picked up on the peer and the execution resumes seamlessly.

1. Operation Time Stamp
The parameter gives a way to measure how long the ToDo list process has taken place.
2. State of ToDo operations
   a. Transitioning: The provisioning is executing the actions defined in the TODO object, no errors have occurred.
   b. Stop: The pool operation has been stopped.
   c. Complete: The thin pool management operation has succeeded. The provision provider needs to do delete the TODO object and admin layer ProcessObjects and the operation is complete.
   d. Rollback: The execution of TODO object has encountered an error, and the provider needs to rollback.
3. Target Object ID
This is the identification of the array component that that the operation is targeted to This information would allow the provider to derive the associations between ToDo List and the array object the ToDo list is going to operate on.
4. ToDo list Operation
   ToDo list Operation describes the array management operation that the ToDo list is trying to accomplish. For a thin provisioning project, the operations include Thin Pool Create, Shrink, Expand and Destroy.

With respect to ToDo action items, a TODO object contains a list of action items. Each action item is described using following information.
1. Execution Sequence Number
This number specifies the sequence in which the action item needs to be executed, starting from 0 for forwarding execution and from the highest number for rollback.
2. Method Name
The provider method that needs be invoked,
3. Parameters of the method
All required input parameters of the method.

With respect to a ToDo list. XML file, a ToDo list can be serialized into an XML file and be objectized from the file. When a ToDo List is created, it is serialized into a file and saved in the local drive. If the execution of the ToDo List is terminated due to array panic, it can be read from the file and resume its operation after array reboots. The following section shows the XML file format of the ToDo list.

<NaviToDo_Job Name="Create_ThinPool"
  Job State="2"
  TimeSubmitted="1219851459"
  NumberOfSteps="44"
  TargetObjectID="21:00:00:00:03:00:00:00"
  StartTime="0"
  rrorStep="0"
  Actions="Encoded CIM Multi requests that capture the actions of the ToDo list"</NaviToDo_Job>

The following describes decoded CIM multi requests that capture the action of the ToDo list.
<?xml version="1.0" encoding="utf-8" ?><CIM CIMVERSION="2.0"
DTDVERSION="2.0"><MESSAGE ID="877"
PROTOCOL
VERSION="1.0"><MULTIREQ><SIMPLEREQ>
<METHODCALL NAME="CreateRG">
<LOCALNAMESPACEPATH>
<NAMESPACE NAME="root"/>
<NAMESPACE NAME="emc"/>
<NAMESPACE NAME="navisphere"/>
</LOCALNAMESPACEPATH>
<PARAMVALUE
NAME="InstanceName"><INSTANCENAME
CLASSNAME="NaviProvision_Feature">
<KEYBINDING NAME="FeatureKey"><KEYVALUE
VALUETYPE="string">NaviProvision_FeatureCF2VH07
2200036</KEYVALUE></KEYBINDING>
</INSTANCENAME>
</PARAMVALUE><PARAMVALUE NAME="is Private"
Type="boolean"><VALUE>true</VALUE>
</PARAMVALUE><PARAMVALUE NAME="raidType"
Type="uint32"><VALUE>1</VALUE>
</PARAMVALUE><PARAMVALUE
NAME="implicitlyRemove"
Type="boolean"><VALUE>true</VALUE>
</PARAMVALUE><PARAMVALUE NAME="priority"
Type="uint32"><VALUE>1</VALUE>
</PARAMVALUE><PARAMVALUE
NAME="rgNumber"
Type="uint32"><VALUE>239</VALUE>
</PARAMVALUE><PARAMVALUE NAME="diskList"
Type="EVDiskDevice"><VALUE.ARRAY>
<INSTANCENAME CLASSNAME="EV_DiskDevice">
<KEYBINDING
NAME="UniqueKeyFromObject"><KEYVALUE
VALUETYPE="string">^^EV^^0^^EV^^4^^EV^^CF2VH072

```
200036^^EV^^0^^EV^^7^^E
V^^9^^EV^^0^^EV^^<KEYVALUE><KEYBINDING>
</INSTANCENAME>
<INSTANCENAME CLASSNAME="EV_DiskDevice">
<KEYBINDING
NAME="UniqueKeyFromObject"><KEYVALUE
VALUETYPE="string">^^EV^^0^^EV^^4^^EV^^CF2VH072
200036^^EV^^0^^EV^^7^^E    V^^10^^EV^^0^^EV^^</KEY-
VALUE></KEYBINDING>
</INSTANCENAME>
<INSTANCENAME CLASSNAME="EV_DiskDevice">
<KEYBINDING NAME="UniqueKeyFromObject"><KEY
VALUE
VALUETYPE="string">^^EV^^0^^EV^^4^^EV^^CF2VH072
200036^^EV^^  0^^EV^^7^^E  V^^11^^EV^^0^^EV^^</KEY-
VALUE></KEYBINDING>
</INSTANCENAME>
<INSTANCENAME CLASSNAME="EV_DiskDevice">
<KEYBINDING
NAME="UniqueKeyFromObject"><KEYVALUE
VALUETYPE="string">^^EV^^0^^EV^^4^^EV^^CF2VH072
200036^^EV^^0^^EV^^7^^E    V^^12^^EV^^0^^EV^^</KEY-
VALUE></KEYBINDING>
</INSTANCENAME>
<INSTANCENAME CLASSNAME="EV_DiskDevice">
<KEYBINDING
NAME="UniqueKeyFromObject"><KEYVALUE
VALUETYPE="string">^^EV^^0^^EV^^4^^EV^^CF2VH072
200036^^EV^^0^^EV^^7^^E    V^^13^^EV^^0^^EV^^</KEY-
VALUE></KEYBINDING>
</INSTANCENAME>
</VALUE.ARRAY>
</PARAMVALUE></METHODCALL>
</SIMPLEREQ>
<SIMPLEREQ>
</MULTIREQ>
</MESSAGE>
</CIM>
```

Figure 14:
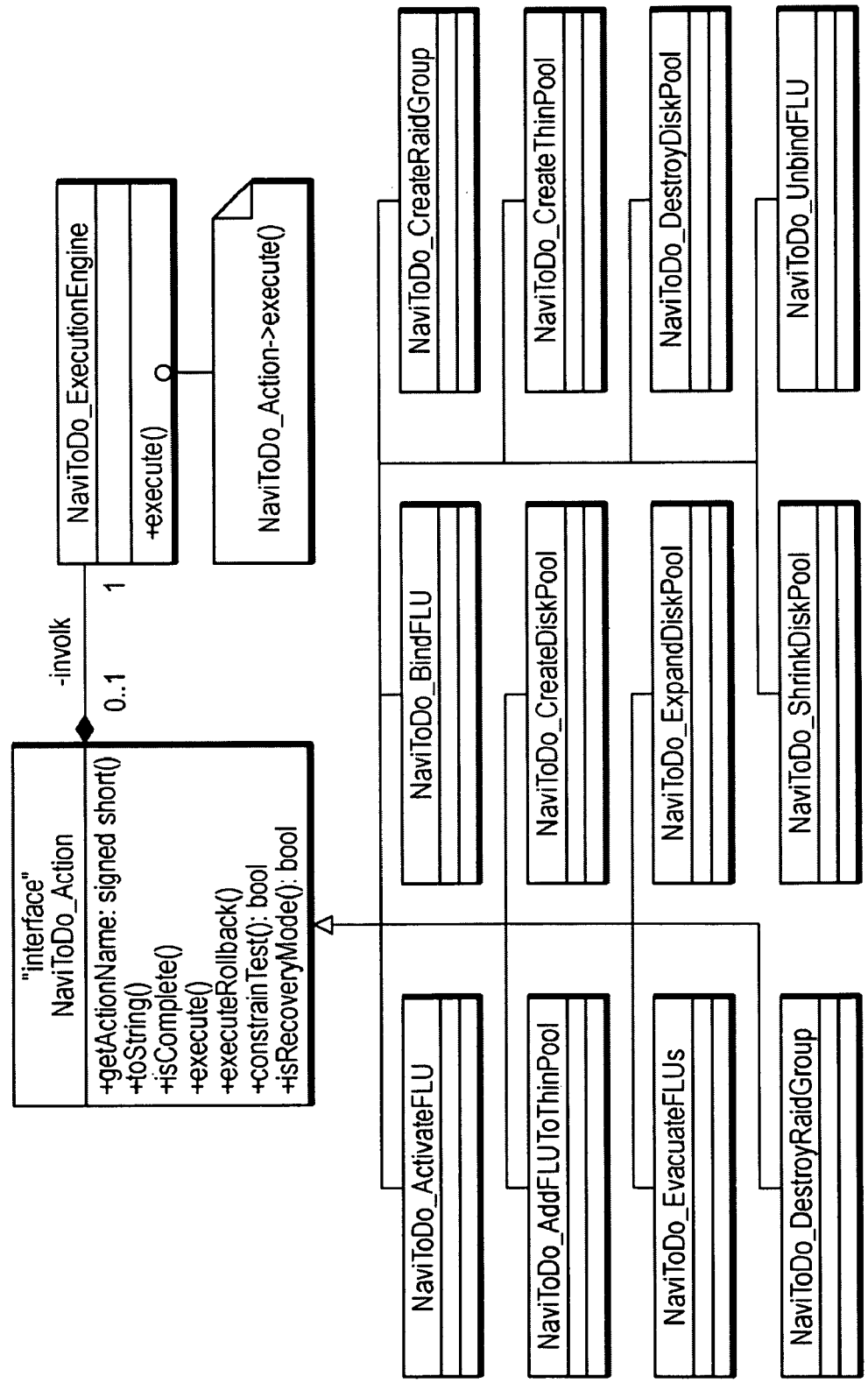

With respect to ToDo object class representation, FIG. 14 depicts a class diagram/model of ToDo execution engine and action classes. This implementation uses strategy design pattern to define a family of procedures, encapsulates a set of ToDo action classes, and makes them interchangeable. This implementation leaves the procedure of each ToDo action independent from the client, NaviToDo_ExecutionEngine. Therefore, it makes it possible to update/change the implementation of ToDo actions without making changes to the execution engine.

Figure 15:
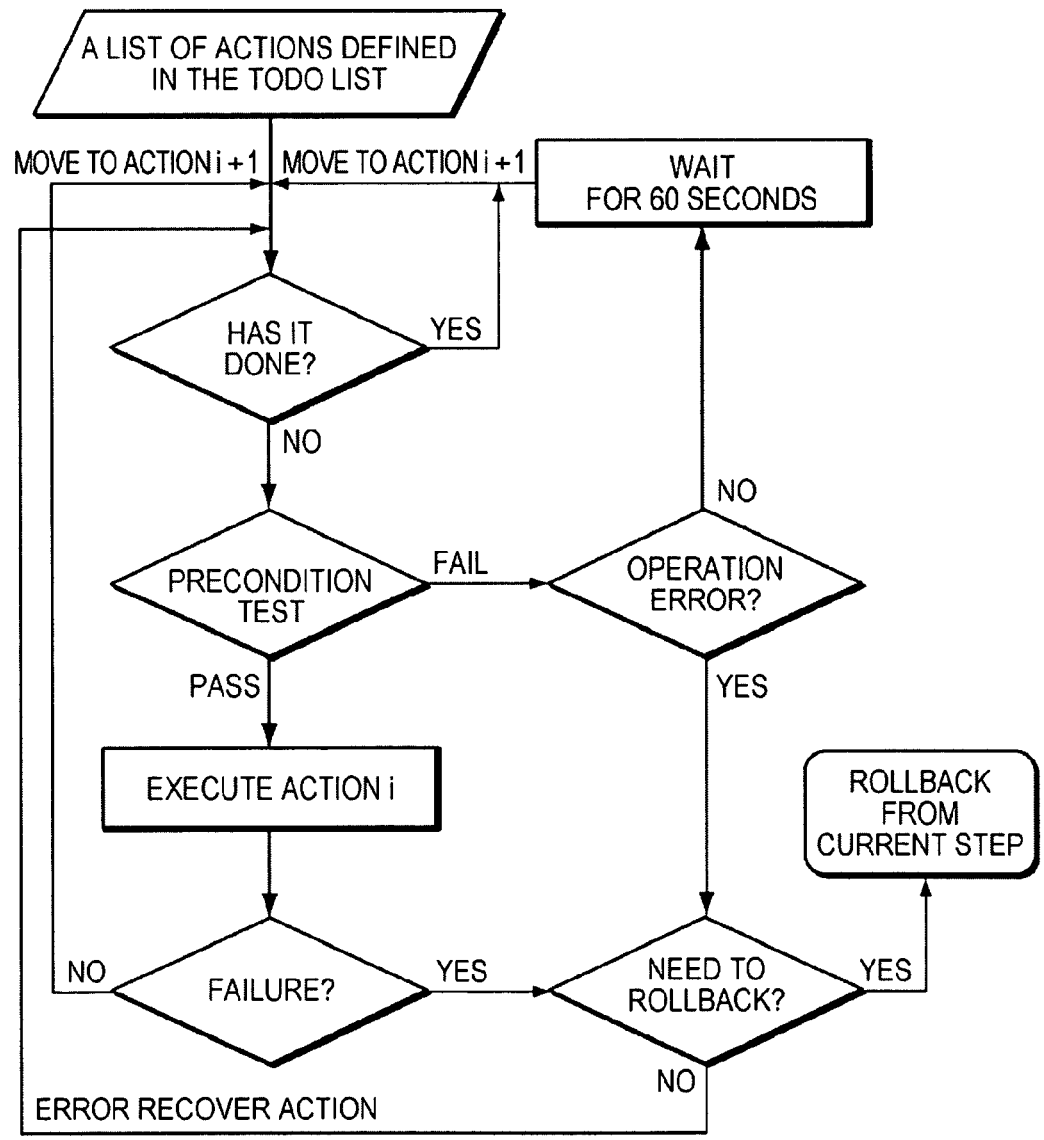

With respect to the TODO execution engine, FIG. 15 depicts the flow control and process sequence of the TODO execution engine. The TODO execution engine does two things before it actually executes an action item in the TODO list.

First, it checks whether the action item has been executed. It does this by polling the system to determine whether the goal of the intended action has been met. For example, existence of a RAID group with specified group number would indicate creating a RAID group action has been executed. This check is necessary to detect the failure point after the CIMOM recovers from previous crash. Using the system condition to detect the failure point of pool management operation is more reliable than replying on a transaction log, which is subject to file and data corruption. The has-it-done check is only performed when the TODO is recovered from a crash. The check is skipped if the TODO is in the initial execution mode.

Secondly, the engine performs a precondition test to determine whether the precondition is satisfied before it can execute the current action item. Usually the preconditions are results of previous action items. For example, the engine checks whether Flare LUNs have been bound successfully before it starts to add them into the thin pool. It repeats the precondition test (every 60 seconds), until all preconditions are satisfied. The execution engine also has an error evaluation process to determine whether a rollback is needed. The action items defined in the TODO object may encounter many errors retuned from admin layer. In general, admin layer errors trigger rollback actions. However, some errors are recoverable or could be ignored. The following table lists all the errors that can be recovered by the provision provider without triggering a rollback.

| TODO action item | Error | Recover plan |
| --- | --- | --- |
| Create RAID Group | RAID group ID has been consumed by user created RAID groups. | Retry RAID group creation with a new number |
| Bind FLU | LUN number has been consumed by a user created FLU. | Retry and bind a FLU with a different number. |
| Activate FLUs in the Thin Pool | Thin driver fails to activate due to PSM failure | Ignore the error and finished the transaction. Thin driver will change the Thin Pool into a degraded mode. |
| Any actions of Pool destroy operation | Any error | No rollback is intended for pool destroy operation. |

Figure 16:
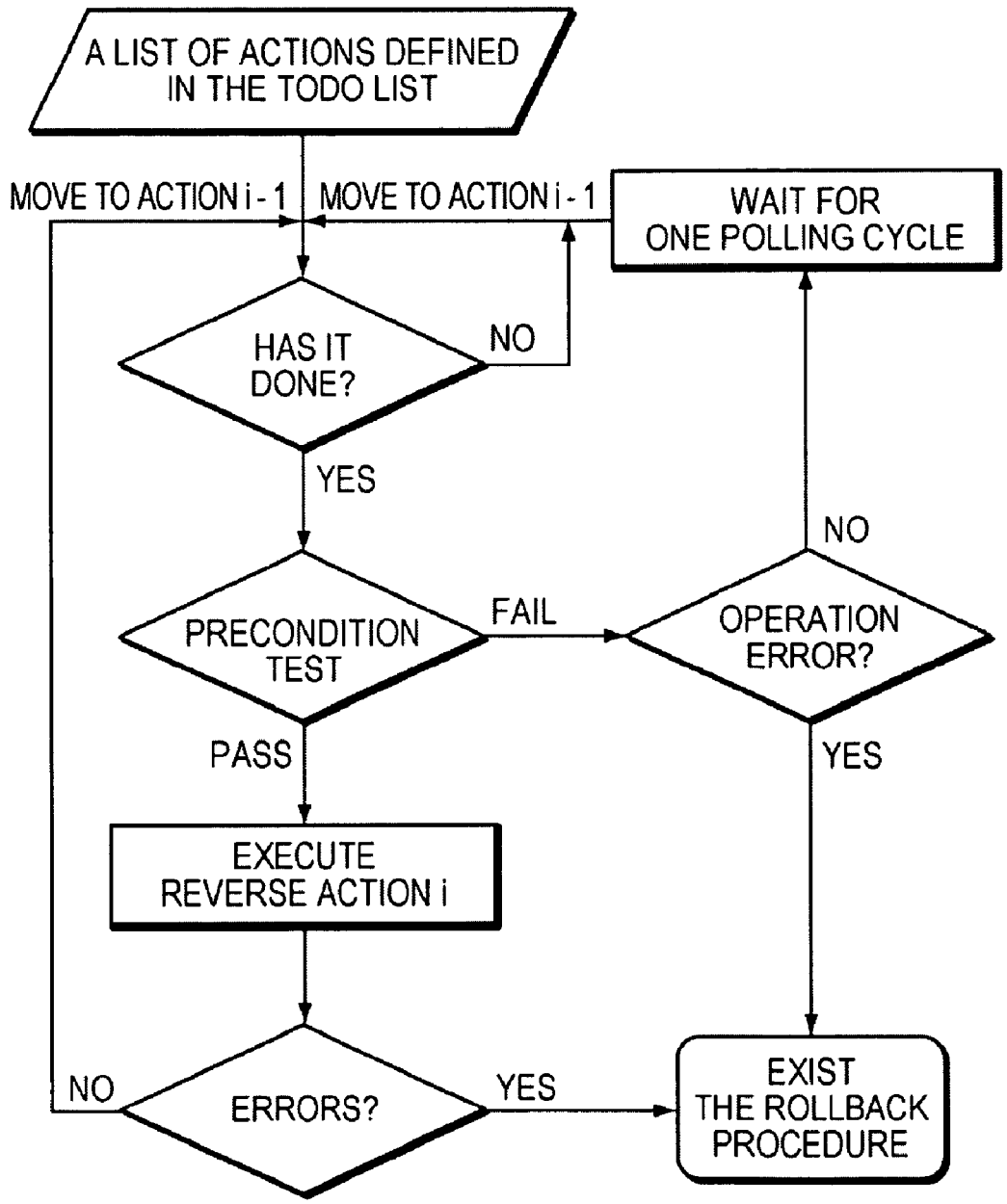

With respect to the TODO rollback engine, FIG. 16 depicts the flow control and process sequence of the TODO rollback engine. At least one implementation may bundle rollback and execution engine into a single function.

With respect to thin pool creation and an example of using Navi ToDo list, the following uses thin pool creation as an example to give a high level description of how Todo object can be used to carry out thin pool management operations.

The following is a list of 5 major steps required to accomplish the provisioning of a thin pool.

1. The provision provider receives a user request to create a thin pool with a set of selected disks.

2. The provision provider passes the request to the provisioning rules engine to obtain the topology definition of the thin pool. The topology of a thin pool defines the type/size/number of internal RAID groups and the size/number of internal Flare LUNs.

3. The provision provider translates thin pool topology into a ToDo list which is immediately saved on the local drive of the SP.

4. The thin pool creation ToDo list is submitted to the transaction execution engine which drives the execution of actions defined in the ToDo list.

a. First, it sends a TLD request to Thin Admin to create an empty thin pool, giving a name and user defined description. Since this is expected to be a very lightweight request for Thin Admin, the provider does not need to poll the system to verify whether an empty pool has been created. It can be safely assumed that a successful return from Thin Admin guarantees the creation of the thin pool. After the thin pool is created, it is immediately represented to the user in the user interface (UI). UI has a progress indicator showing that work is in progress to construct the pool.

b. After step a), the provision provider sends a TLD request to Core Admin to create a disk pool with a set of disks. Once disks are added to a disk pool, they are excluded from being used by user to create public RAID groups.

c. Upon a successful return of step b, the provision provider loops through a list of RAID group creation TLD requests to create internal private RAID groups. The provider does not have to poll the system to pick up created RAID groups. A successfully returned TLD request guarantees the creation of RAID groups. The provider moves to the next step without polling the subsystem to verify availability of created RAID groups.

d. After step c, the provider loops through a list of TLD requests to bind private Flare LUNs to the private RAID groups. Binding LUN is an asynchronous operation. The provider kicks off all the bind requests and waits until all LUNs become available before moving to the next step.

e. Once all the FLUs are bound, the provision provider loops through a list TLD request to Thin Admin to add FLUs to the thin pool.

f. After all FLUs are added to the pool, the provider sends a single TLD request to Thin Admin to activate all FLUs. This promotes the thin driver to consume these FLUs.

g. Once all FLUs are activated, the provider deletes the Todo object to release resources consumed by the object.

5. After the successful execution of the ToDo list, the transaction execution engine cleans up the ToDo file and releases all the resources obtained during the execution.

Step 4 is the entire execution of the ToDo list. The detailed process is illustrated in FIG. 17 which illustrates the thin pool creation sequence.

Figure 17:
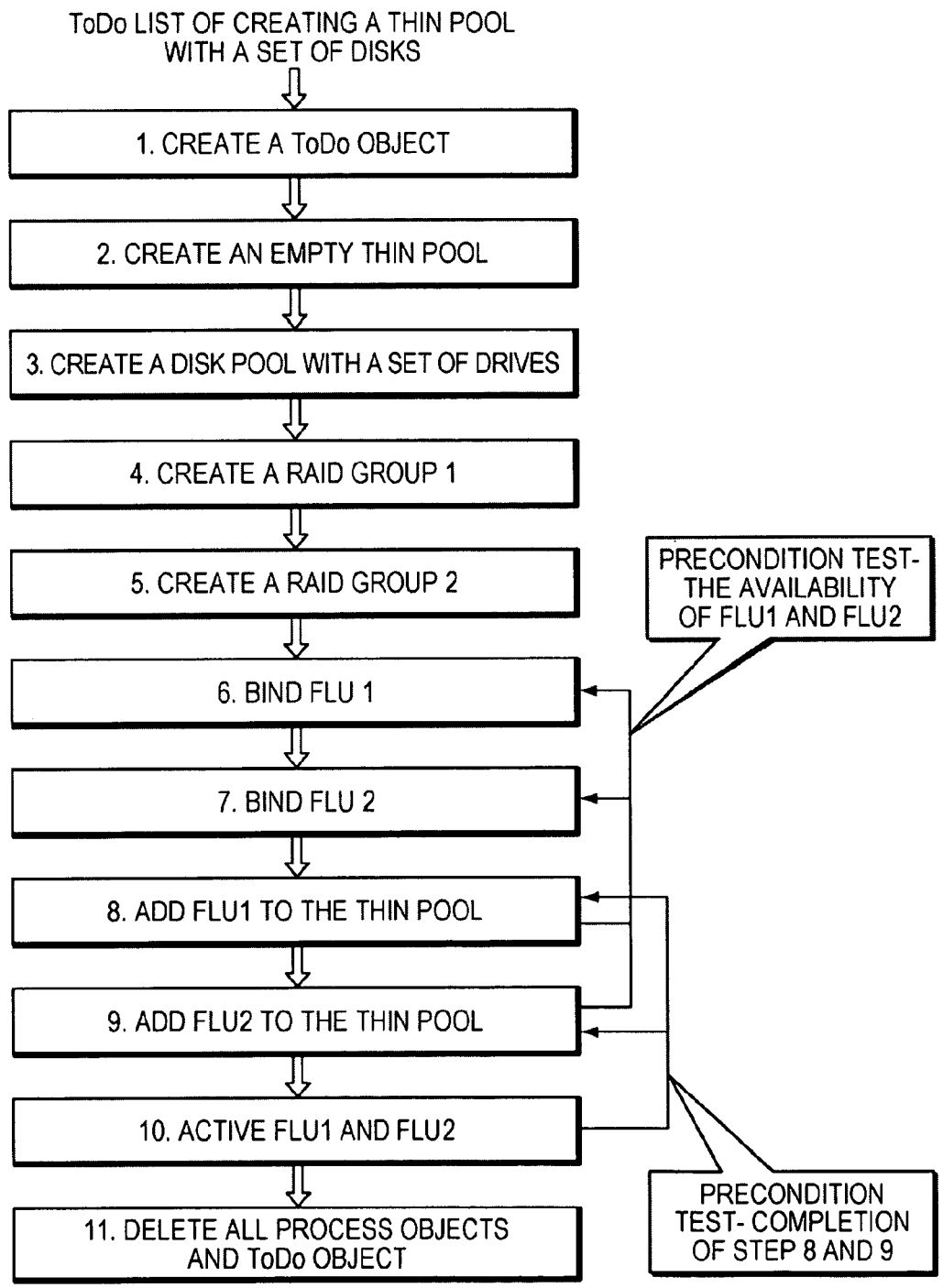

Each box shown in FIG. 17 is a customized ToDo_Action geared towards a discrete array management operation targeted to a specific array logical or physical component. A pool creation ToDo list can bundle these discrete steps into an inseparable logical entity, and the transaction execution engine can sequentially execute ToDo list as a single transaction. From a user's perspective, the operation of provisioning a thin pool is a single operation. The execution sequence and the interdependencies are all handle by the ToDo list. Users do not have to understand and control these internal operations. This feature provides an easy way for users to perform complex array management tasks with a minimal user involvement, therefore making the software very easy to use.

Figure 18:
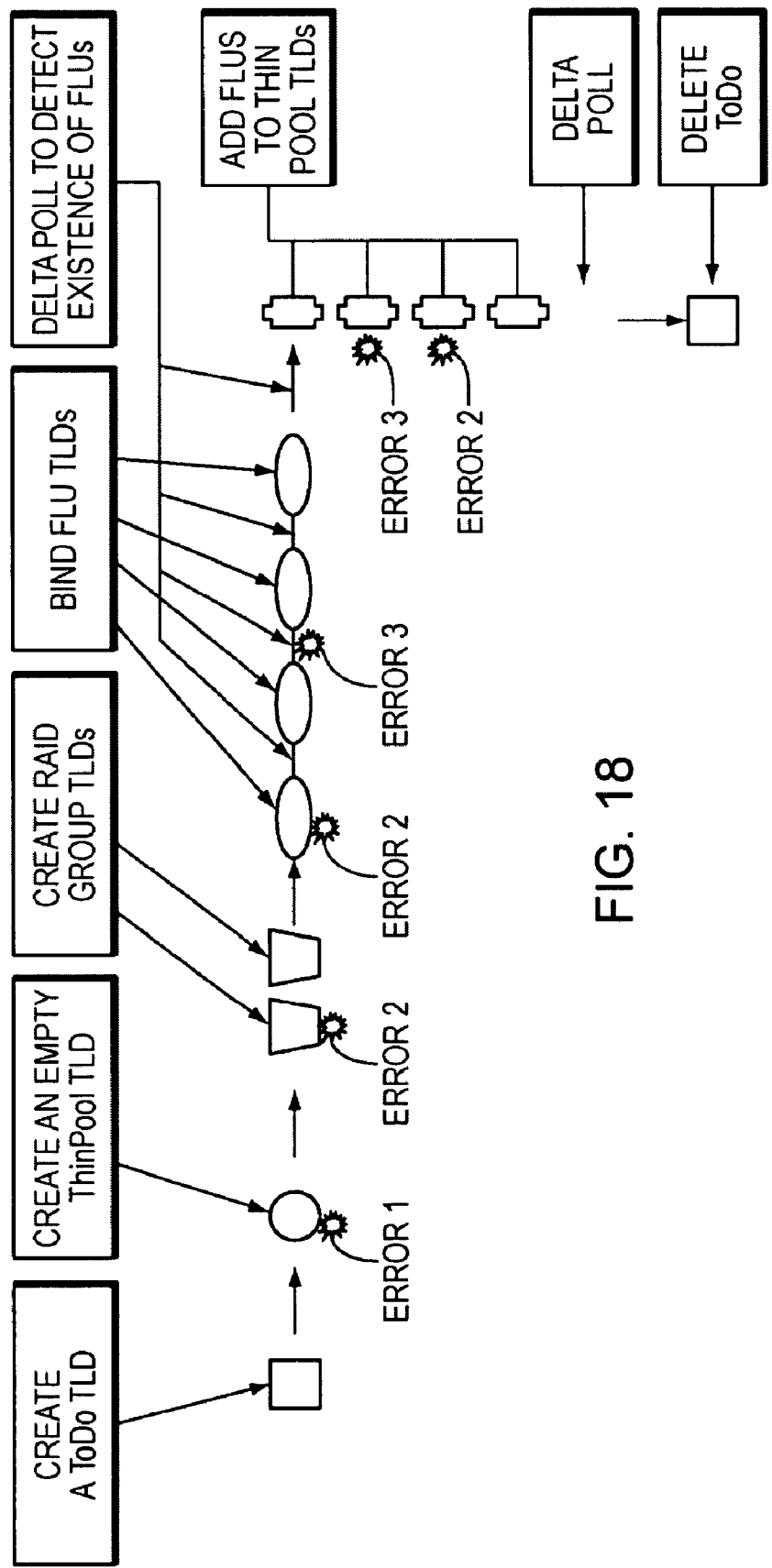

With respect to error handling of thin pool creation, FIG. 18 depicts three kinds of errors could happen during the creation of a thin pool. Depending on different conditions, the provision provider takes different recovery actions. A goal of error handling is to make the process opaque to the user. In particular, the entire process should either succeed or fail without leaving any temporary objects. Described below are details of these errors and how the provider recovers from these error conditions.

Error Condition 1

The provider receives an error from Thin Admin while it sends a TLD request to create an empty thin pool. In this case, the provision provider simply returns an error to the UI, indicating the disk pool creation request has failed. Nothing has been changed on the array.

Error Condition 2

The provider receives unrecoverable errors on TLD requests to create private RAID groups, bind private Flare LUNs or create an empty disk pool. In this case, the provider resets the status of the Todo object and start to rollback. If CIMOM crashes before finishing the rollback process, the provider continues the rollback process after it detects that a Todo object is in a rollback state.

Error Condition 3

The CIMOM crashes before finishing thin pool creation process. In this case, the provision provider resumes the creation process based on the unfinished steps predefined in the Todo object.

An embodiment may implement the techniques herein using code executed by a computer processor. For example, an embodiment may implement the techniques herein and processing engine 620 and other elements shown in FIG. 6 and other Figures, using code which is executed by a processor of the data storage system. As will be appreciated by those skilled in the art, the code may be stored on the data storage system on any one of a computer-readable medium having any one of a variety of different forms including volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, DVD or other optical storage, magnetic cassettes, magnetic tape, magnetic disk storage or other magnetic storage devices, or any other medium which can be used to store the desired information and which can accessed by a data storage system processor.

While the invention has been disclosed in connection with preferred embodiments shown and described in detail, their modifications and improvements thereon will become readily apparent to those skilled in the art. Accordingly, the spirit and scope of the present invention should be limited only by the following claims.

What is claimed is:

1. A method for use in controlling multi-step storage management operations, the method comprising:
   deriving, using a processor, from a specification of a desired configuration of a data storage system, a multi-step transaction for producing the desired configuration, the multi-step transaction comprising logic that reacts to results of an intermediate step within the multi-step transaction, wherein the multi-step transaction includes a set of management operations;
   arranging each management operation of the set of management operations of the multi-step transaction in an order based on a multi-step transaction description, wherein the multi-step transaction description includes a procedure for producing the desired configuration;
   bundling the set of management operations together and automatically executing the bundle asynchronously as an inseparable entity;
   invoking each management operation of the set of management operations based on the multi-step transaction;
   performing a precondition test, by reading a system condition prior to executing a next management operation of the set of management operations, wherein the system condition includes a status of a previous management operation of the set of management operations;
   based on the precondition test, determining whether an error occurs prior to completion of each management operation of the set of management operations, wherein the error includes a recoverable error and an irresolvable error;
   based on the determination, upon occurrence of the recoverable error, automatically resolving the recoverable error and continue invoking an unfinished management operation of the set of management operations;
   based on the determination, upon occurrence of the irresolvable error, allowing automatic rollback of a finished management operation of the set of management operations and allowing a user to resume an unfinished management operation of the set of management operations after the user resolves the irresolvable error; and upon occurrence of a failure of the data storage system, automatically restarting the multi-step transaction, wherein the multi-step transaction starts from an unfinished management operation of the set of management operations.

2. The method of claim 1, wherein a management operation is a CIM based management operation.

3. The method of claim 1, further comprising:
treating a set of discrete CIM operations as a single transaction, while maintaining the status and progress of the single transaction.

4. The method of claim 1, further comprising:
allowing automatic rollback to undo finished operations.

5. The method of claim 1, further comprising:
saving multi step transactional based operations in an xml file using SMI-S CIM multi-request format.

6. The method of claim 1, further comprising:
deriving the multi-step transaction from a hierarchical task framework; and
initiating an execution engine that drives and executes business logic of predefined tasks.

7. The method of claim 1, further comprising:
providing a transaction control feature within SIM-S based Concrete Job.

8. The method of claim 1, further comprising:
bundling a set of discrete CIM requests into a single logic operation in the multi-step transaction.

9. The method of claim 1, further comprising:
providing flexible control of dependencies of multi operations included in the multi-step transaction.

10. The method of claim 1, further comprising:
deriving, based on a hierarchical task framework, from a specification, a multi-step transaction description for the multi-step transaction.

11. The method of claim 1, further comprising:
in an orderly transaction based on current configuration information about system resources, directing a management server to execute management operations applied to the system resources to change the configuration of the system in accordance with a specification.

12. The method of claim 1, further comprising:
receiving, from a management server, operations status which indicates the success or failure of each operation in the multi-step transaction.

13. The method of claim 1, further comprising:
taking status-based actions during execution of the multi-step transaction.

14. The method of claim 1, further comprising:
reversing an already executed operation of the multi-step transaction.

15. A system for use in controlling multi-step storage management operations, the system comprising:
a processor;
first logic deriving, from a specification of a desired configuration of a data storage system, a multi-step transaction for producing the desired configuration, the multi-step transaction comprising logic that reacts to results of an intermediate step within the multi-step transaction, wherein the multi-step transaction includes a set of management operations;

second logic arranging each management operation of the set of management operations of the multi-step transaction in an order based on a multi-step transaction description, wherein the multi-step transaction description includes a procedure for producing the desired configuration;

third logic bundling the set of management operations together and automatically executing the bundle asynchronously as an inseparable entity;

fourth logic invoking each management operation of the set of management operations based on the multi-step transaction;

fifth logic performing a precondition test by reading a system condition prior to executing a next management operation of the set of management operations, wherein the system condition includes a status of a previous management operation of the set of management operations;

sixth logic determining, based on the precondition test, whether an error occurs prior to completion of each management operation of the set of management operations, wherein the error includes a recoverable error and an irresolvable error;

seventh logic automatically resolving, based on the determination, upon occurrence of the recoverable error, the recoverable error and continue invoking an unfinished management operation of the set of management operations;

eighth logic allowing, based on the determination, upon occurrence of the irresolvable error, automatic rollback of a finished management operation of the set of management operations and allowing a user to resume an unfinished management operation of the set of management operations after the user resolves the irresolvable error; and ninth logic automatically restarting, upon occurrence of a failure of the data storage system, the multi-step transaction, wherein the multi-step transaction starts from an unfinished management operation of the set of management operations.

16. The method of claim 15, wherein a management operation is a CIM based management operation.

17. The system of claim 15, further comprising:
tenth logic treating a set of discrete CIM operations as a single transaction, while maintaining the status and progress of the single transaction.

18. The system of claim 15, further comprising:
tenth logic allowing automatic rollback to undo finished operations.

19. The system of claim 15, further comprising:
tenth logic saving multi step transactional based operations in an xml file using SMI-S CIM multi-request format.

* * * * *